US005790820A

United States Patent [19]
Vayda et al.

[11] Patent Number: 5,790,820
[45] Date of Patent: Aug. 4, 1998

[54] RADIAL GRAPHICAL MENUING SYSTEM

[76] Inventors: Mark Vayda; Nancy Weyl, both of 1330 Mercer La., McLean, Va. 22101

[21] Appl. No.: 486,237

[22] Filed: Jun. 7, 1995

[51] Int. Cl.$^6$ ........................................................ G06F 3/100
[52] U.S. Cl. ............................................................... 395/352
[58] Field of Search .................................. 395/156, 161, 395/157, 352, 353, 348; 345/146, 168, 169

[56] References Cited

U.S. PATENT DOCUMENTS

| | | | |
|---|---|---|---|
| 4,029,915 | 6/1977 | Ojima | 364/709.12 |
| 4,042,777 | 8/1977 | Bequaert et al. | 364/709.16 |
| 4,547,860 | 10/1985 | Lapeyre | 364/709.16 |
| 4,567,567 | 1/1986 | Lapeyre | 364/709.16 |
| 4,586,035 | 4/1986 | Baker et al. | 395/157 |
| 4,686,522 | 8/1987 | Hernandez et al. | 395/156 |
| 4,772,882 | 9/1988 | Mical | 345/146 |
| 4,789,962 | 12/1988 | Berry et al. | 395/156 |
| 4,891,777 | 1/1990 | Lapeyre | 345/168 |
| 4,896,291 | 1/1990 | Gest et al. | 395/156 |
| 5,087,910 | 2/1992 | Guyot-Sionnest | 345/169 |
| 5,117,455 | 5/1992 | Danish | 341/22 |
| 5,186,629 | 2/1993 | Rohen | 245/119 |
| 5,198,802 | 3/1993 | Bertram et al. | 345/146 |
| 5,250,929 | 10/1993 | Hoffman et al. | 345/146 |
| 5,251,125 | 10/1993 | Karnowski et al. | 345/146 |
| 5,270,709 | 12/1993 | Niklsbacher | 345/168 |
| 5,283,560 | 2/1994 | Barlett | 395/156 |
| 5,287,448 | 2/1994 | Nichol et al. | 395/159 |
| 5,317,687 | 5/1994 | Torres | 395/159 |
| 5,365,360 | 11/1994 | Torres | 395/159 |
| 5,367,298 | 11/1994 | Axthelm | 341/22 |
| 5,367,625 | 11/1994 | Ishitani | 395/159 |
| 5,371,844 | 12/1994 | Andrew et al. | 395/155 |
| 5,375,200 | 12/1994 | Dugan et al. | 395/159 |
| 5,384,910 | 1/1995 | Torres | 395/156 |

FOREIGN PATENT DOCUMENTS

| | | |
|---|---|---|
| 2016184 | 9/1979 | United Kingdom . |
| WO8902369 | 3/1989 | WIPO . |

OTHER PUBLICATIONS

Hopkins et al., "Pies: Implementation, Evaluation, and Application of Circular Menus", (University of Maryland, College Park, 1988) pp. 1–27.

Advertisement, The NewO Company, *The NewO Writehander: The New One-Hand Keyboard For Computers, Terminals, Displays And Other ASCII-Coded Devices*, (received Jun. 4, 1979).

IBM Technical Disclosure, *Keyboard For Handheld Computer*, vol. 27, No. 10A (Mar. 1985).

*Primary Examiner*—Phu K. Nguyen
*Assistant Examiner*—Cliff N. Vo
*Attorney, Agent, or Firm*—Baker & Botts, L.L.P.

[57] ABSTRACT

A menuing system which simplifies the interaction required between a user and one or more application programs. Menu commands are displayed radially from a highlighter default position and a user may select one of these commands by moving the highlighter a slight distance in the direction of the desired command ("snapping"). Provision is also made for selection of multiple command elements through the use of horizontal, vertical, and diagonal menus as well as command quadrants formed by the menus. In all instances, menu characteristics such as command sizes may be varied by the user through an easily accessible set-up facility. The speed of execution is limited only by the user's mind.

46 Claims, 19 Drawing Sheets

FIG. 9

RADIAL GRAPHICAL MENUING SYSTEM

FIELD OF THE INVENTION

The present invention relates to graphical user interfaces and specifically to graphical user interfaces for use with command oriented menu driven programs.

BACKGROUND OF THE INVENTION

Computers have become a common tool for achieving an almost endless number of functions. As the use of the computer has increased, the diversity of users has also widened. More people are choosing or being required to use a computer for more of their daily functions.

Menu driven software programs were developed so that novice users could more easily make a selection among available commands and thus operate computers. These menu driven software programs eventually led to the development of a windowing environment in which the user may have multiple programs and files operable at one time with a selection among multiple commands, each command appearing in the window of the program data file being worked on. To effect selection within applications and switching between windows, a hand operated pointing device became a critical component of a computer system running windowing software. Typically this device has been a mouse.

Applications running in a windowed environment typically have a main menu bar with more specific commands being displayed in "pull down" menus stemming from specific portions of the main menu bar or command headings. When the user wants to execute a command, the user must move the mouse so that a pointer on the display points to the command on the desired menu heading. The command heading activates a pull down menu which displays a plurality of commands available for execution. A command from the pull down menu may then be selected for execution. In that typical method, only one command is executed at once. Movement amongst the menu bar and the pull down menus requires a great deal of movement of the mouse. Hence, it may be difficult for the young, the elderly or any novice user to traverse and coordinate the positioning of the mouse and thus the pointer with which the execution is made. Also, these activities may be time consuming.

SUMMARY OF THE INVENTION

Therefore, it is an object of the present invention to provide a graphical user interface to menu driven programs which makes commands quicker and easier to select and execute.

It is a further object of the present invention to provide operation of menu driven programs in a more efficient and less time consuming manner.

It is also an object of the present invention to provide a graphical user interface which exploits mnemonic tools, permitting a user to more easily use menu driven software.

It is another object of the present invention to provide a graphical user interface which allows selection of multiple commands with a single operation.

It is yet another object of the present invention to provide a graphical user interface which allows selection of commands with minimal movement of a mouse or other "selection device."

It is still another object of the present invention to provide distinct configurations of menu systems for distinct programs and/or for variously skilled users to optimize their efficiency.

It is another object of the present invention to provide a menu which is executable during active work on a file.

It is another object of the present invention to provide a translucent executable command menu on the screen.

It is yet another object of the present invention that commands may be executed while a file on which the command is to be executed is still visible.

It is another object of the present invention to make the typical pointer unnecessary in selecting and executing most commands.

It is yet another object of the present invention to permit selection and/or execution of the select/execute commands by "snapping" a "highlighter" from one predetermined position to another.

It is also an object of the present invention to permit selection of commands by "snapping" a highlighter from a highlighted focus position radially to highlight a select/execute command position.

It is yet another object of the present invention to permit a user to scroll through command labels through a highlighted display position from a plurality of two or more radii extending from the focus position.

It is another object of the present invention to limit eye/hand coordination.

It is a further object of the present invention to limit device movement for the user to as little as about a fraction of a centimeter.

It is also an object of the present invention to provide a system in which there is no un-programmed movement of a highlighter or mouse, thus making the computer, and menu driven software operating thereon, accessible to users of a wider range of age and capability.

It is another object of the present invention to provide a system in which a user input device, such as a mouse, may be programmed to indicate selections to a system operating on an attached host system.

It is another object of the present invention to permit direct access to a multitude of commands on screen which are selectable and executable from any position in an open file.

It is a further object of the present invention to provide access to at least about 100 commands with as few as about two or so clicks of a user input device such as a mouse.

It is another object of the present invention to provide a system on which experienced users may even more quickly execute commands.

It is a further object of the present invention to provide access to a user to about 1000 commands in as little as about four clicks.

These and other objects of the invention are achieved by simplifying the interaction between a user and an application program. Menu commands are displayed radially from a focal point or focus. A user may select one of these commands by "snapping" to the command with minimal mouse movement. Movement to further positions on the same radius may select other commands. In another embodiment, the user may select multiple command elements through the use of horizontal, vertical, and diagonal menus as well as command quadrants formed by the intersection of these menus. In yet another embodiment, a menu which is permanently resident on the screen is provided (in addition to any other menu in current use) from which a plurality of commands including "help" may be activated at any time on any selection highlighted. "Help" may also be selected on most commands by clicking a second time on the selected command. For novices, this order may be reversible or a double button click may be substituted at the choice of the programmer or user. In this embodiment, menus accommodating distinct levels of skill may be selected.

In another embodiment, a series of concentric rings, each having a series of commands, may be provided so as to allow selection and even execution of commands among a greater hierarchy of command sets.

Speed of execution is limited only by the user's mind. Beginners, intermediate and expert computer users will find this system faster. The system is particularly advantageous for disabled persons, particularly those having eye and/or hand movement difficulties. Eye and hand coordination are less important than memory in selecting and executing commands.

Other objects, features and advantages of the present invention will become apparent upon consideration of this disclosure and the accompanying figures.

BRIEF DESCRIPTION OF THE DRAWINGS

FIG. 9 illustrates a translucent select/execute menu according to one embodiment of the present invention.

DETAILED DESCRIPTION OF THE PREFERRED EMBODIMENTS

Logic used in seeking a particular command may be compared to the file organization process on a command based operating system such as the disk operating system sold under the trademark ("DOS") by Microsoft. With a vertical line (|) substituting for the back slash (\) used in a file path, an example of a command might look as follows:

C:|format|page|footer|footerA|every page|edit.

This command path may also be represented by six command indicators (||||||edit). Using such a representation for deep "command paths" may enable a search algorithm keys on all the "edit" command in all command directories at the sixth level rather than searching each of the directories from the top level down. The result is a great saving both in programming and computer access time, and perhaps computing power and cost.

Using the same logic, a programmer's job is made easier with a system as in the present invention in which deeply embedded commands are directly accessible. Programmers may be able to achieve the same goals using less code because the menu organization of the present invention greatly simplifies operation for executing commands deep in a program. Therefore, the overall design of application programs is also simplified.

Figure 1:
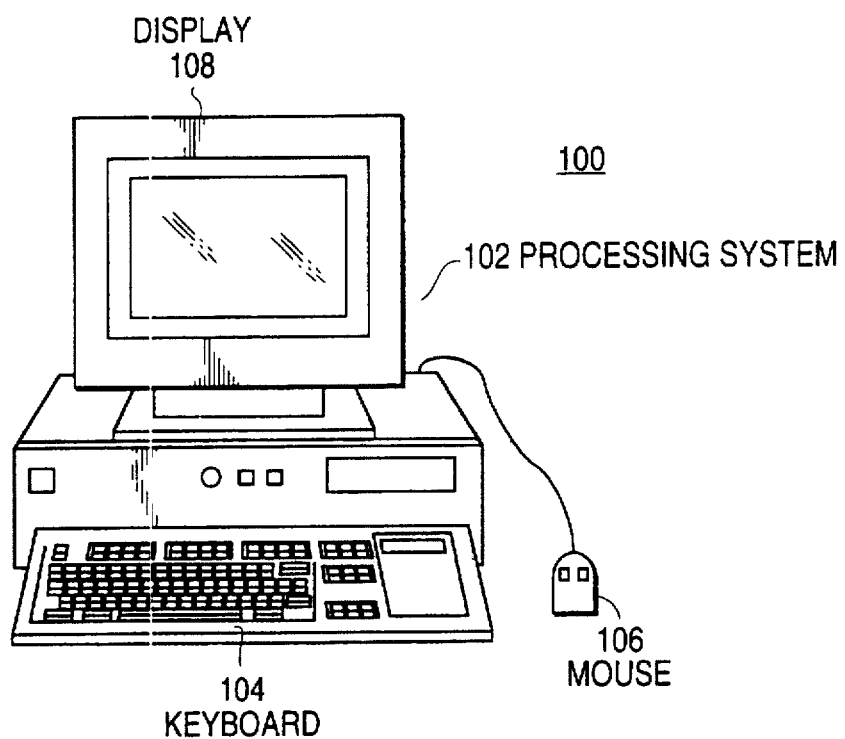
FIG. 1 depicts a computer system according to one embodiment of the present invention.

As such, the present invention provides a system for accessing commands quickly and efficiently. FIG. 1 depicts a computer system according to one embodiment of the present invention. Computer system 100 comprises a processing system 102, a keyboard 104, a user input device 106, and a display 108. Computer system 100 may also comprise other output devices including a printer, a modem, a projector, a speaker, etc. User input device 106 preferably has a plurality of buttons.

User input device 106 is preferably a mouse and specifically is preferably either an eraser mouse (i.e., a track stick and pen mouse, such as those sold under the trademark (POWER POINT) by IBM) or a touch mouse (i.e., a small pad mouse). User input device 106 may also comprise a keyboard, key pad, finger pad, mouse pad, track-ball, pen pointer, insert correction device, touch screen, stylus, joystick, voice receiver, camera, "red button" input device, motion sensor, modem, or voice activation input device, for example. Further, any combination of these devices may be used for user input device 106.

Figure 2:
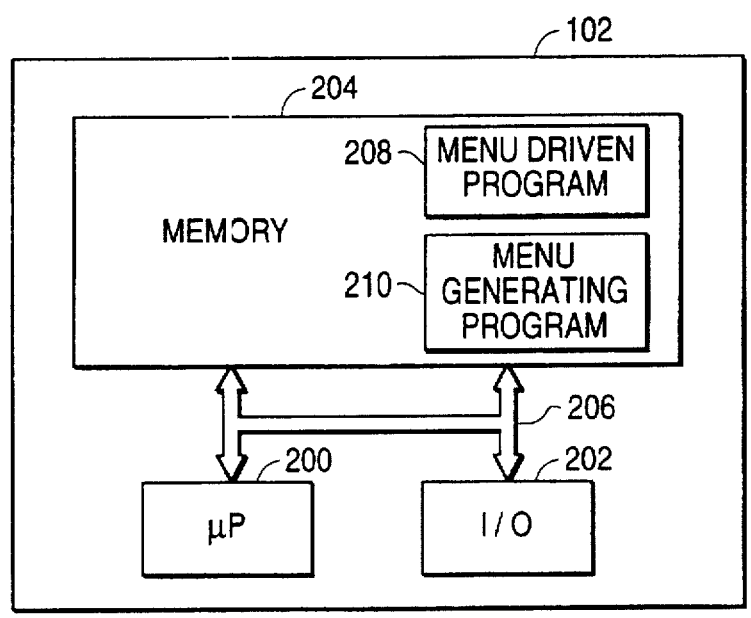
FIG. 2 depicts a processing system according to the present invention.

As depicted in FIG. 2, processing system 102 comprises a microprocessor 200, an input/output module 202, a bussing system 206, and a memory 204. Additional memory modules, bussing systems, and other processing structures, such as caches, may also be provided. In general, processing system 102 may comprise a personal computer such as one having a microprocessor such as an Intel 386, 486 or Pentium™ chip or a Motorola 68030 or 68040 chip, for example. While one embodiment of the present invention employs a personal computer for processing system 102, any processing system may also be used. For example, any system employing a graphical display and user input device in communication therewith may be the environment on which the present invention operates.

Memory 204 comprises at least one menu driven program 208 and a menu generating program 210. Menu driven program 208 may comprise a word processing program, a spreadsheet program, a CAD program, etc. Menu driven program 208 is typically an "off the shelf" application program. For example, menu driven program 208 may comprise word processing programs sold under the trademarks ("WordPerfect"), ("Microsoft Word"), etc., or a spreadsheet program sold under the trademarks ("Lotus 1-2-3"), ("Microsoft Excel"), etc., as well as many other application programs such as database programs, graphics programs or management productivity programs.

Menu generating program 210 cooperates with menu driven program 208 to present menus to a user through display 108. Menu generating program 210 preferably overrides any menu generating functions that menu driven program 208 may have. When menu generating program 210 is activated, both menu generating program 210 and menu driven program 208 are co-resident in memory. Thus, menu generating program 210 acts as an enhancement for menu driven program 208.

The incorporation of the menu generating system of the present invention into a computer system may reduce the available operating memory. By merging the menu generating system of the present invention in place of the menu generating system of an operating system or by developing a new operating system using the menu generating system of the present invention, the available memory may even be increased over an existing operating system because the present menuing system may consume less memory. Alternatively, this system may operate in conjunction with a windowing program by overlying itself onto the command input and execution functions of the windowing program.

One preferred embodiment of the function of menu generating program 210 will now be described. This embodiment is only illustrative and is not intended to limit the scope of the invention.

In general, menu generating program 210 is activated upon start-up of computer system 100 during the booting process. As such, when any menu driven program 208 is selected for activation by a user, menu generating program 210 automatically cooperates with the menu driven program 208 to provide its enhancement features. Menu generating program 210 preferably supports multiple menu driven programs 208. More than one menu driven program 208 may be in memory simultaneously with menu generating program 210 supporting each of the menu driven programs 208. Also, more than one menu generating program 210 may be operating at the same time. For example, each menu driven program 208 may have a copy of menu generating program 210 operating in conjunction therewith. Other matching schemes may also be used.

For exemplary purposes, the operation of menu generating program 210 will be demonstrated in cooperation with a single menu driven program 208 which is a word processing program. The following discussion applies equally to other menu driven programs which may be similarly used with the present invention.

When the menu driven program 208 is activated, unless the user varies the set-up to do otherwise, menu generating program 210 opens the file last operated on by that menu driven program 208, placing the cursor where it had been when the user exited the file. Further, a menu highlighter as described below may be placed in the last menu on the screen or in use when menu driven program 208 was exited.

If menu driven program 208 is a word processing program or a spreadsheet program, menu generating program 210 may be set to automatically open the file with the cursor in the sentence or cell where it had been when the file was exited. If the user wishes to work on this file, he/she may do so. If however, the user wishes to work on another file, perform another command, etc., he/she may activate a file management menu, as illustrated below. This option may be exercised by a function key, a combination of keys, or any other predetermined device/mouse combination.

It is to be understood that, as will be discussed in detail below, the user may vary the above through the set-up facility. Thus, the user may set up the system so that a file is not called up immediately upon activation of the word processing application. Set-up features may be established for each menu driven program 208 resident on the computer system.

In addition, a select/execute command menu may be activated by a button combination on user input device 106, for example to activate a select/execute menu. Other input devices for activating the select/execute menu may be used. For example, touch screen and/or voice activation may be used. Alternatively, a default select/execute menu may be automatically displayed at the time the system is powered up or at any other predetermined event during the course of processing data. Each of these possibilities may be selected and/or controlled via a set-up function.

Figure 3:
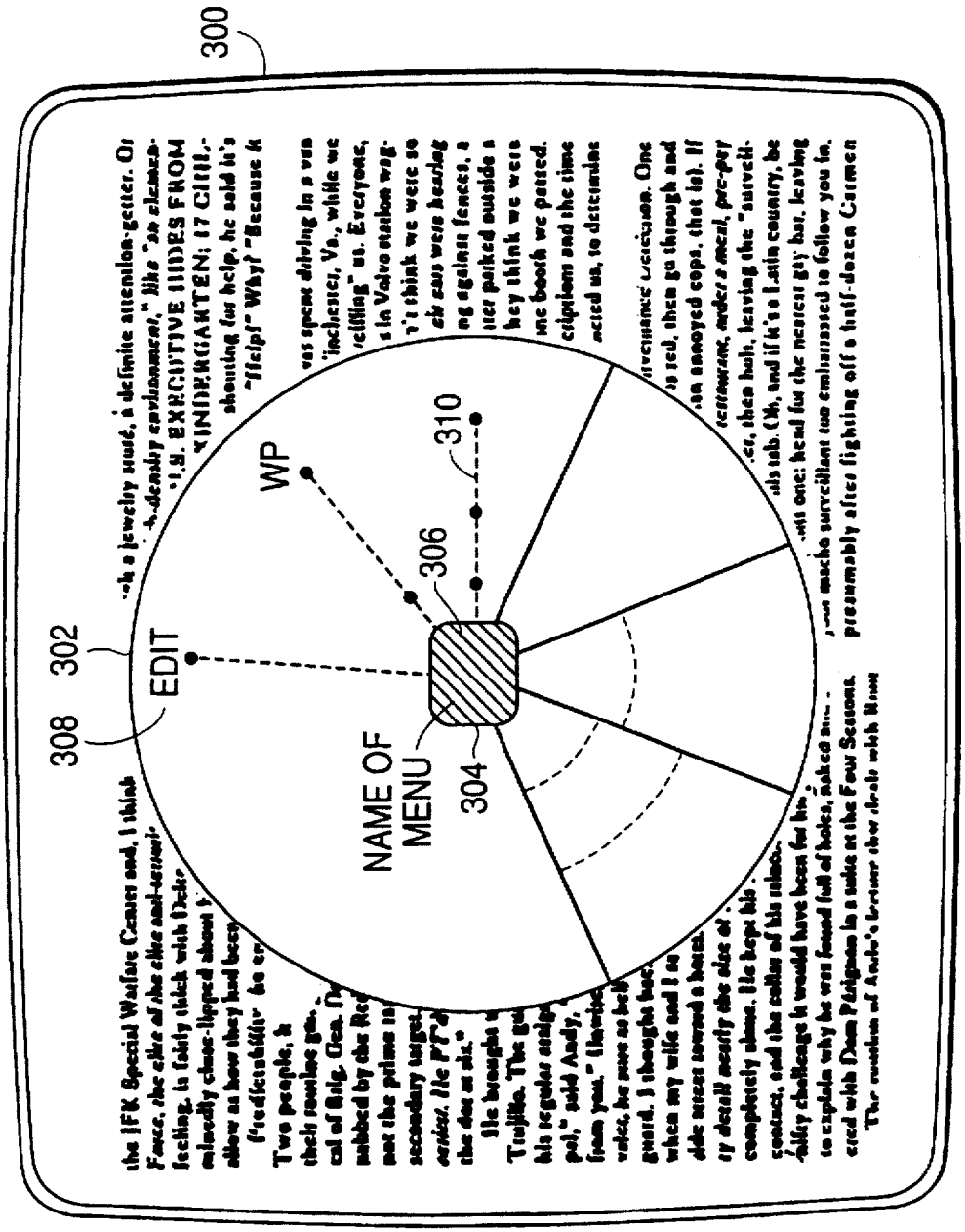
FIG. 3 illustrates a select/execute menu according to one embodiment of the present invention.

FIGS. 3–10 depict various embodiments of select/execute menu screens (hereinafter "menu screens") 300–1000. As is easily recognized, the content of the menu screen may vary greatly while still falling within the scope of this invention. Menu screen 300 comprises a select/execute menu 302. Select/execute menu 302 comprises a focus position 304, a highlighter 306, and a plurality of select/execute command selectors 308. Highlighter 306 is indicated in focus position 304 by hatching. Preferably, the name of the menu is provided in focus position 304 and highlighted by highlighter 306 upon presentation of the select/execute menu. In use, highlighter 306 may comprise a different color, a different intensity, a different shading, hatching, etc. to distinguish it from other portions of select/execute menu 302. A plurality of select/execute command selectors 308 are radially distributed about focus position 304 as depicted in FIG. 3 by large dots. These dots on the radii on FIG. 3 are not presented actually on the screen. Rather, the dots indicate the location of command selectors 308 along radii passing through focus position 304. In the locations where dots are depicted in FIG. 3, a word or other select/execute command indicator may be provided, as with "EDIT" in FIG. 3, each of which may be executed by a snap or click.

When used herein, the term "focus position" is meant in the context of a location to which a user's attention is drawn. This position need not be in the center of an object.

It is to be understood that it is also possible for menu screen 300 to reflect higher level commands. For example, menu screen 300 may, in a preferred embodiment, include commands that describe available applications rather than commands within a word processing application as illustrated in FIG. 3. An example of the former possibility (not shown) would be a menu screen 300 that included commands such as "Word Processing", "Spreadsheet", "Drafting Applications", and "Database Applications". In this case, activation of one of these selections would result in either the execution of a particular application (such as WordPerfect™ if "Word Processing" is selected) or the presentation of an additional menu screen for selection of a particular application under the selected functional category. In the latter case, selection of "Word Processing" may result in a menu screen offering a choice between WordPerfect™, Microsoft Word™ or Displaywrite,™ for example.

Each of the "screens" described herein refer to either the menu and/or combination of menus displayed on display 108 or the equivalent displayed in a window on display 108 in a windowing environment. For simplicity the term "screen" is used. It should also be noted that the graphical menus described could be presented in a select/execute menu in a window that is separate from the active window or in blank screen space outside of the active window. Screens are used herein for ease in presenting embodiments only.

Select/execute menu 302 may operate as follows. Upon generation of select/execute menu 302, menu generating program 210 causes a highlighter 306 to be placed at or substantially at focus position 304. Menu generating program 210 also cooperates with input/output module 202 to receive input from user input device 106. A slight movement of user input device 106 "snaps" highlighter 306 from focus position 304 to a command selector 308 (represented by a name or icon) that appears in the radial direction most closely correlated to the movement of user input device 106. For example, if there are three radii extending from a focus position located at sixty degrees, one hundred eighty degrees and 300 degrees, movement in a direction of about 30 degrees would "snap" the highlighter from the focus position to the command located along the radius at 60 degrees. If user input device were moved at about three hundred fifty degrees, the command along the radius at three hundred degrees would be "snapped." A "snap" is a program controlled movement using user input device 106 to sharply move highlighter 306 along one of a plurality of pre-programmed radii from a specific location, e.g., the default position, to a specific selection along the radius. In most instances, the default position is focus position 304. Again, the radius along which highlighter 306 moves is the one most closely correlated to the movement of user input device 106.

In FIG. 3, for example, a slight movement of user input device 106 toward the word "EDIT" snaps highlighter 306 to the "EDIT" command selector 308. As such, the word "EDIT" becomes highlighted or a portion of select/execute menu 302 surrounding the word "EDIT" becomes highlighted to indicate its selection. In other words, movement of user input device 106 causes highlighter 306 to move from its default position (generally focus position 304) along one of a plurality of pre-programmed radial paths to a command selector along that radial path.

Each radius may have a single command which is executed by a single "snap" along that radius. The radii may also have a plurality of commands distributed thereon, each selectable by "snapping" the appropriate number of times (or moving user input device 106 the equivalent distance to reach and select the desired command) and then clicking on a button of user input device 106 to execute the command.

The movement of user input device 106 required to "snap" can be valued in set-up to be minimal. For example, a fraction of a centimeter may be established in set-up as the value of movement necessary to snap highlighter 306 to a selector, name or icon any distance from focus position 304 and can cause the command to be executed if there is only one command on that radius. It is not necessary to click one of the buttons on user input device 106 to execute such commands. If, however, there is more than one command on a radius, such as depicted on radius 310 of FIG. 3, or if the user is a beginner, a click of user input device 106 may be used to execute the command after snapping to the command. To select commands on multiple command radii, more than one snap or equivalent movement may be used. Execution in either case may be requested by the user by a click of user input device 106. Menu generating program 210 receives the execute request and relays this information to menu driven program 208 for execution. In this manner, any movement of user input device 106 may cause execution of a command. Therefore, no loss of motion by the user occurs.

The present invention thus enables elimination of a pointer on the screen for selecting commands. A pointer may be incorporated if desired, however. Elimination of the pointer, however, likely increases available memory and processing time associated with executing pointer programming.

One select/execute menu 302 may be brought up on display 108 by a click of user input device 106 or a keystroke on keyboard 104 with a highlighter 306 at the default position. The default position is preferably focus position 306. Any command presented on select/execute menu 302 may be selected by (1) snapping or (2) snapping and clicking a selection among the pre-programmed radial paths. Movement of user input device 106 of a fraction of a centimeter snaps the command along the selected radius. If there is only one command on the radius, it can be activated by a single move or snap. Thus, every movement of user input device 106 can be a controlled, positive move which selects and/or executes a command. Execution by snapping may be desirable for expert users but undesirable for novices. Therefore, through the set-up facility, execution may either be programmed to occur upon snapping or snapping and clicking.

Because this device is sensitive to movement of user input device 106, errors may occur, particularly by novice users. To prevent this possibility, a novice user may design select/execute menus to have fewer commands distributed thereon with larger separation of the commands around the focus position. For example, the radii along which the commands are distributed may be separated by at least about 45 degrees. Other degrees of separation may be used to satisfy the user. For example, ten degrees or 90 degrees may be used. A combination of degrees of separation may also be used, depending upon the choices of the user. In any event, should an error occur, a snap in the correct direction may correct the selection. Alternatively, an immediate depression of the "escape" key may halt execution of a command, for example.

Also, some commands may be particularly dangerous to be executable by a single snap operation. For example, a delete file operation may be such a dangerous operation. Therefore, for certain commands, a confirmation click may be used before a command is executed. In this arrangement, certain commands may be determined to be special commands which are only executable upon a separate operation in addition to the snap.

On a single command radius, "Help" specific to that command can be activated by a second action (snap or click) of a button of user input device 106, for example. If the radius contains more than one command, selection and execution of "Help" may be performed, for example, by a snap to the command and a double button click to execute help on that command. Other options exist for "Help" on multiple command radii and other major menu configurations. "Help" may remain on screen during the execution of the command, with the cursor always active in the file. Several options exist for escaping from "Help," including completion of the command and pressing the "escape" key on the keyboard, for example. If "help" not pertaining to a particular selected command is desired, "park" keys may be used to receive help on other commands. "Park" keys are explained below, particularly with respect to FIG. 10.

Also, set-up may be used to allow a user to customize menu sequences and arrangements of commands. For example, the user may design a default menu for a particular menu driven program 208. The default menu may be presented upon initial execution of menu driven program 208. Also, every command may be accessible by a single snap by locating that command in the default menu. Other variations may also be made in set-up to allow for the user's skills to be most effectively utilized.

Often times, two or more commands are necessary to complete a desired function. For example, in a copy of text operation, generally, a block-copy-paste sequence of commands is performed. Therefore, it may be necessary, or desirable, for the menu screen to remain on the screen during the whole of the operation. If there is an initiating command (e.g., block) and at least one completion command (e.g., copy and paste), a single select/execute menu preferably contains these commands. This select/execute menu remains present on the screen until the at least one completion command has been selected and executed. During these steps, it may be desirable for the menu to be translucent as described in detail below.

More than one select/execute menu 302 may be displayed across the screen at one time. Also, multiple select/execute menus 302 may be programmed to overlay each other. One click of user input device 106 at the highlighter default position may bring up the next select/execute menu.

Figure 4:
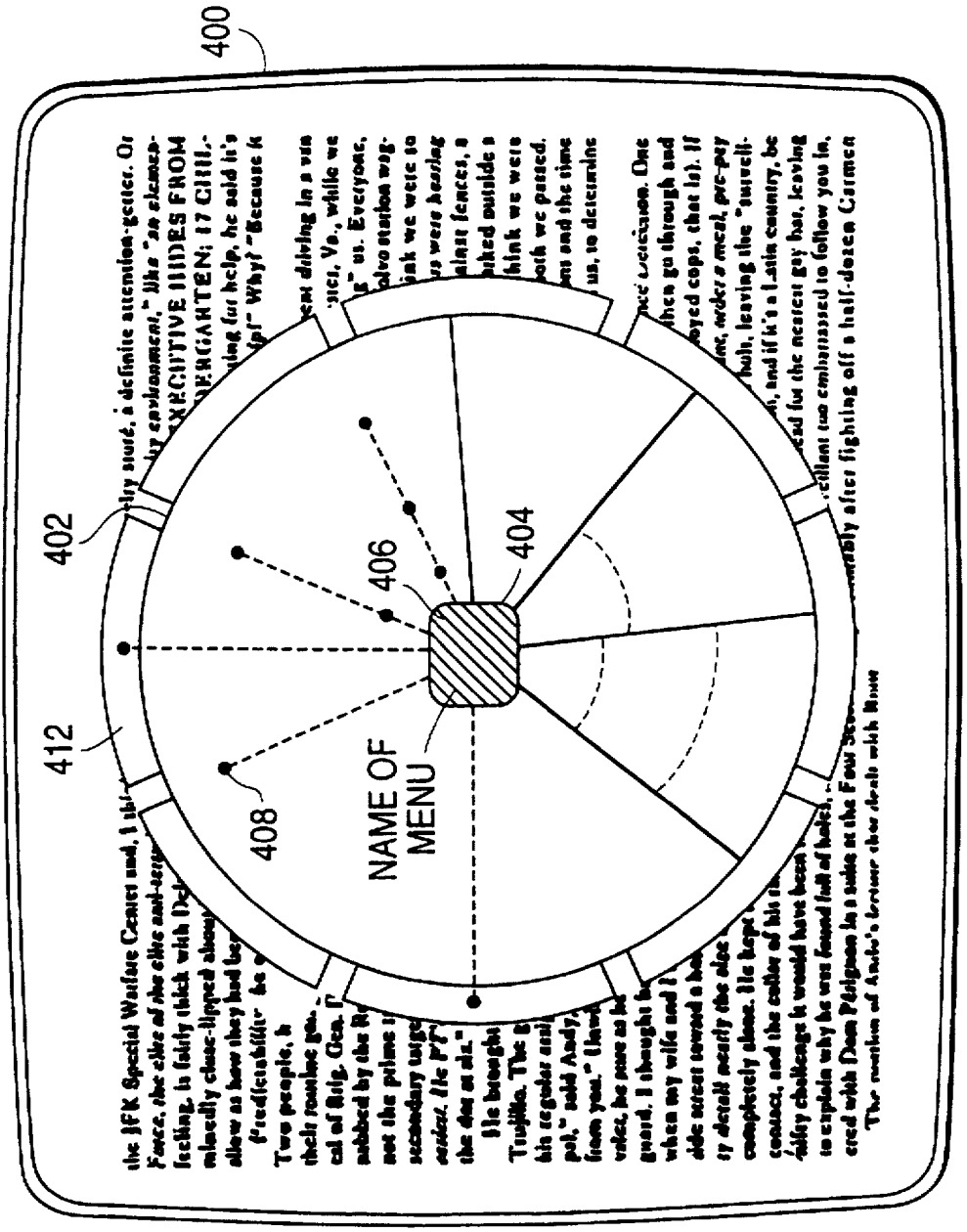
FIG. 4 illustrates a select/execute menu according to another embodiment of the present invention.

In another embodiment, multiple select/execute menus may be chosen through the use of tabs extending from the presently active select/execute menu. FIG. 4 illustrates such an embodiment. Menu screen 400 comprises an active select/execute menu 402. Select/execute menu 402, like select/execute menu 302, comprises a focus position 404, a highlighter 406, and a plurality of select/execute command selectors 408. Tabs 412 extend from select/execute menu 402. Each tab 412 may represent a different select/execute menu 402.

Tabs 412 on the periphery of the overlaid select/execute menus 402 allow a user to select among a greater number of menus by a single snap or snap and click, according to chosen pre-settings, or by moving without a snap along a pre-programmed radius. For example, each tab may activate one of a plurality of the select/execute menus 402 which are overlaid on each other.

Each command selector may represent either an executable command or an indicator for another select/execute menu. Executable commands and indicators may be differentiated on select/execute menus such as by shading, coloring, font, etc. Upon selection of an executable command, the command may be executed. Upon selection of an indictor for another select/execute menu, another select/execute menu may then be presented.

Figure 5:
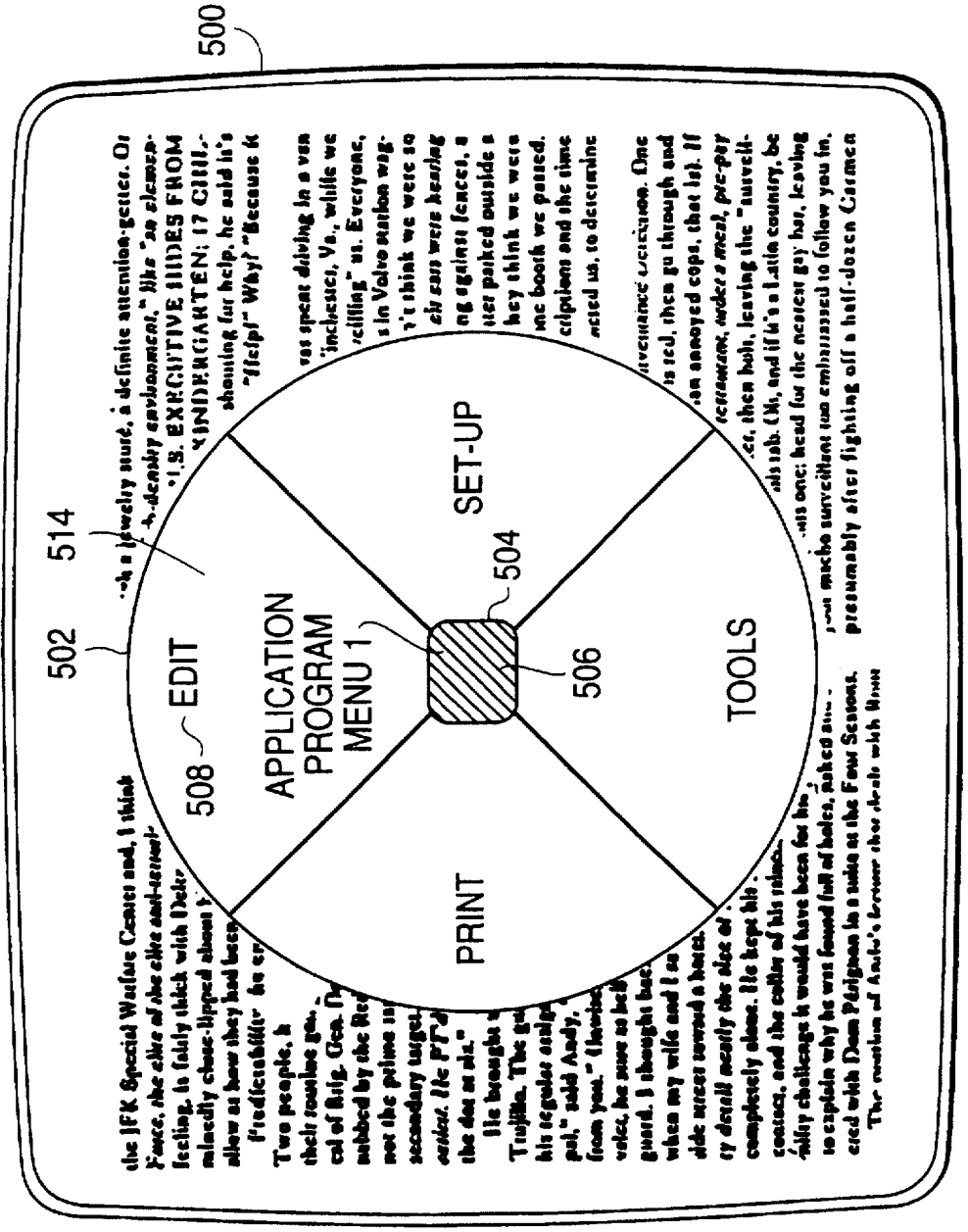
FIG. 5 illustrates a select/execute menu according to another embodiment of the present invention.

For example, FIG. 5 illustrates an example of an select/execute menu which may be presented after selection of the "WP" (word processing) indicator of select/execute menu 302. FIG. 5 depicts a menu screen 500. Menu screen 500 comprises a select/execute menu 502. Select/execute menu 502 comprises a focus position 504, a highlighter 506, and command selectors 508.

Focus position 504 may contain a name or icon indicating the name of the select/execute menu being presented. For example, a name such as "Application Program Menu 1" may be presented in focus position 504. Also, the name may be presented just outside of focus position 504 or in a heading presented near select/execute menu 502.

Highlighter 506 may be snapped into one of a plurality of command indicator sectors 514. In this embodiment, command indicator sector 514 may be highlighted to indicate the selection of the command selector provided therein. For example, command indicator sector 514 may be highlighted when the "EDIT" command selector 508 is snapped. Also, command selector 508 may be highlighted instead of or in addition to the highlighting of command indicator sector 514.

Select/execute menu 502 represents a select/execute menu which may be used in a word processing applications program, for example. After select/execute menu 502 is presented, a user may activate any of the commands in view. For executable commands, selection and thus execution may be effected by a single snap in the direction of the command. Alternatively, a snap and click may execute the command. For indicators, selection of the subsequent select/execute menu may be effected by a single snap or a snap and click.

Figure 6:
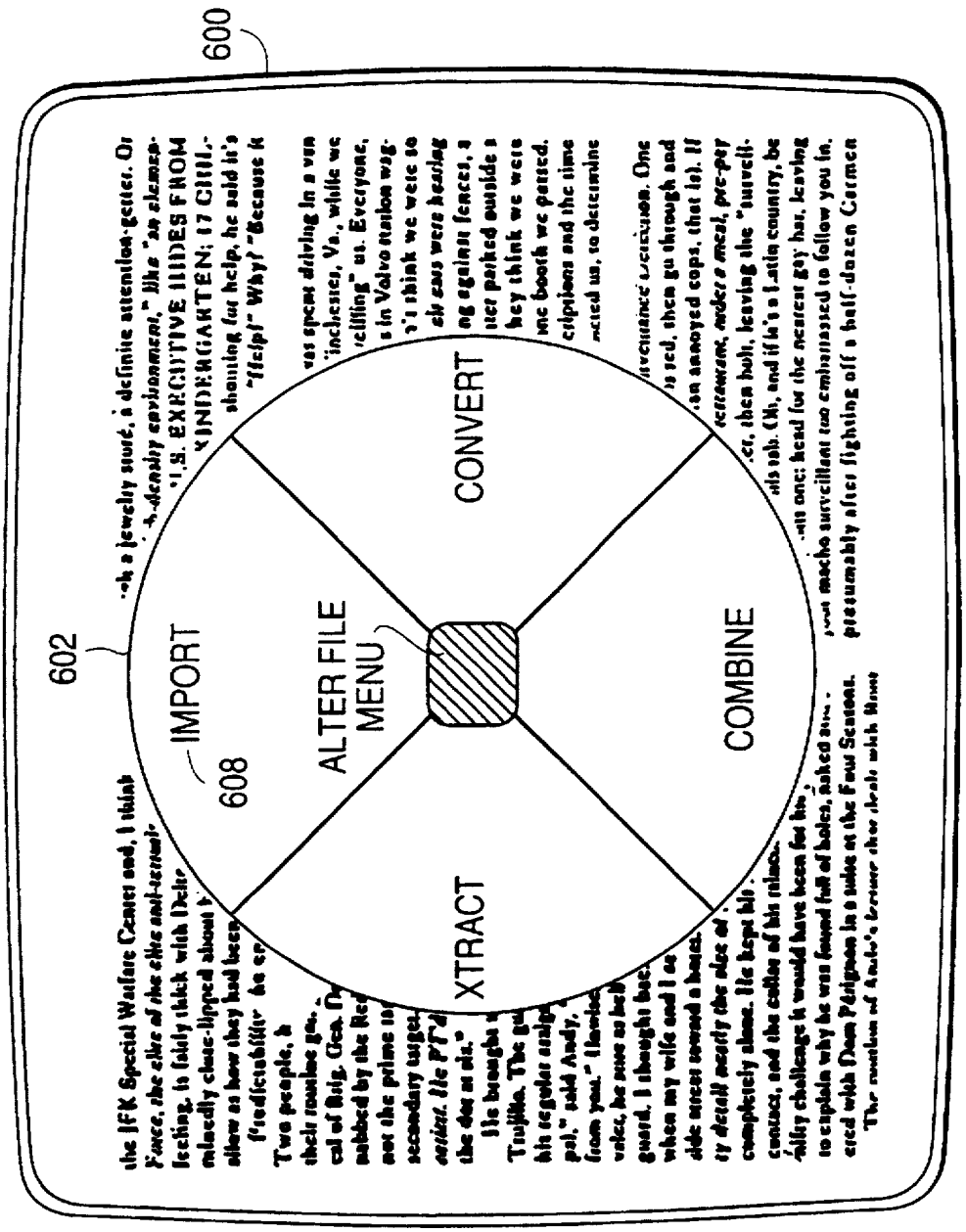
FIG. 6 illustrates a select/execute menu according to another embodiment of the present invention.
Figure 14:
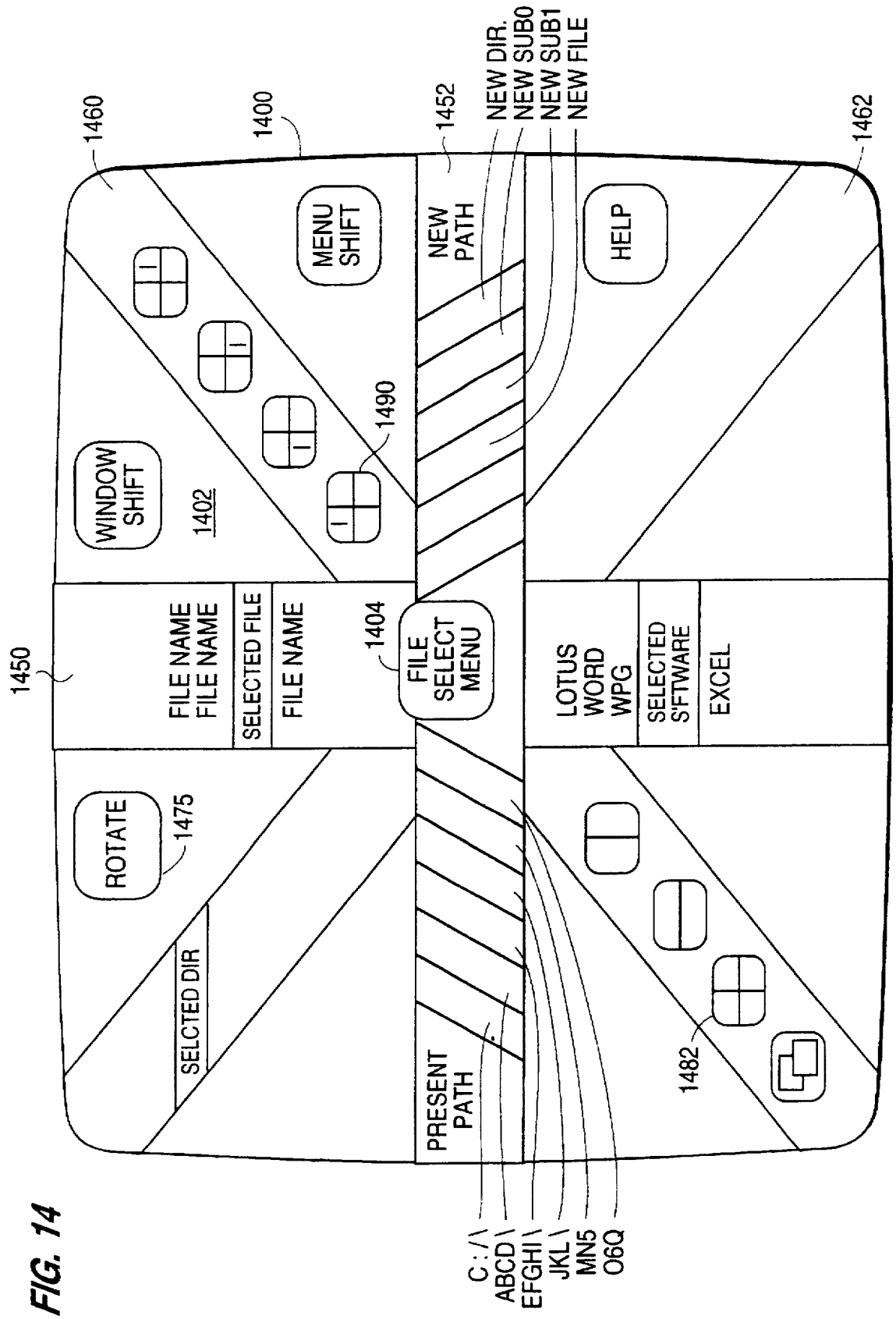
FIG. 14 illustrates a multiple command selection select/execute menu according to another embodiment of the present invention.

FIG. 6 depicts another embodiment of a menu screen 600 having a select/execute menu 602. In FIG. 6, the "import" command selector 608 may be an indicator. Upon selection of the "import" indicator a "File Management Menu" may be presented. An example of a "File Management Menu" is depicted in FIG. 14 and is discussed below.

Figure 7:
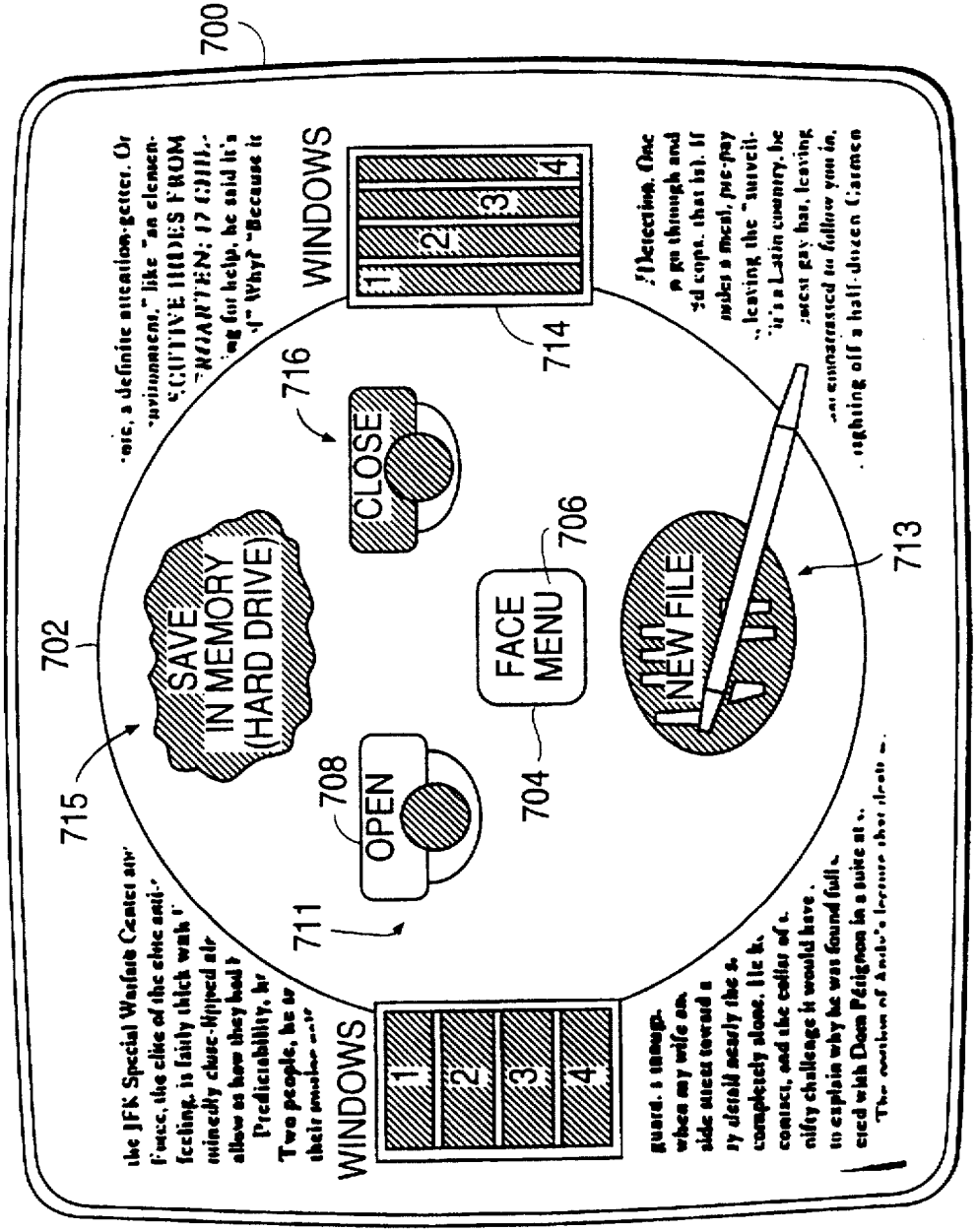
FIG. 7 illustrates an icon-in-icon select/execute menu according to one embodiment of the present invention.

FIG. 7 depicts another embodiment of a menu screen 700 having a select/execute menu 702 disposed therein. Select/execute menu 702 comprises a focus position 704, a highlighter 706 and a plurality of command selectors 708. Each command selector 708 comprises a command icon 711, 713, 715 or 716. Command icons 711, 713, 715, and 716 are selected to provide a mnemonic device for assisting the user in remembering the location of various commands within select/execute menu 702.

In addition, select/execute menu 702 serves as a mnemonic menu icon or an icon doubler or super icon. This embodiment is an "icon-in-icon" embodiment. In FIG. 7, the menu icon is a face with command icons 711, 713, 715, and 716 comprising components of that face. For example, open command icon 711 is an open eye, close command icon 716 is a closed eye, save command icon 715 is a brain, and new file command icon 713 is a mouth. Other menu or command icons may also be used. For example, a house, a car, a tree, etc. may be used, each menu doubler icon representing a different select/execute menu. As described below, the icon-in-icon embodiment greatly aids memory of specific commands and command menus.

FIG. 7 is an example of a "file" select/execute menu and is depicted as, and called "FACE." The number of command selectors may vary. In this example, the file select/execute menu has six command sectors: save, close, new file, open, and windows (horizontal and vertical). Save and close may be executable commands. Open and new file may be indicators for other select/execute menus and when selected cause select/execute menus corresponding thereto to be presented. Other menus may have more or fewer command sectors to satisfy the user.

These mnemonic tools greatly increase the speed at which an experienced or even novice computer user can learn, operate, and remember specific menu driven programs 208. The limited eye and hand movement and coordination necessary to perform selections using the icon-in-icon allow both a novice and expert user to learn the location of commands quickly. The icon-in-icon menu is a strong memory enhancement, or mnemonic tool such that second, third and additional uses will become almost rote operations for a majority of users. The program may be run with the menus displaying word labels, icons or both as command selectors.

The icon-in-icon presentation reinforces the association of one icon and related words with another (super icon) and related word labels. The icon-in-icon feature is particularly useful for users who learn more quickly by graphical representations than by words. In such instances, it may not even be necessary to present the words in the command sector. As use increases, the menu icon and command icon become associated with the commands and command sets they represent. An experienced user may thus tailor the select/execute menus to his/her specific desires and needs.

Further aiding a user's memory, individual command icons may be designed to resemble a component of a full menu icon as in FIG. 7. Individual command icons may also have meanings associated with their appearance and or location on the menu icon. Examples of "icon doublers" or "super icons" might be a house, dog, cat face, with the individual features carrying the meaning of individual commands.

Figure 8:
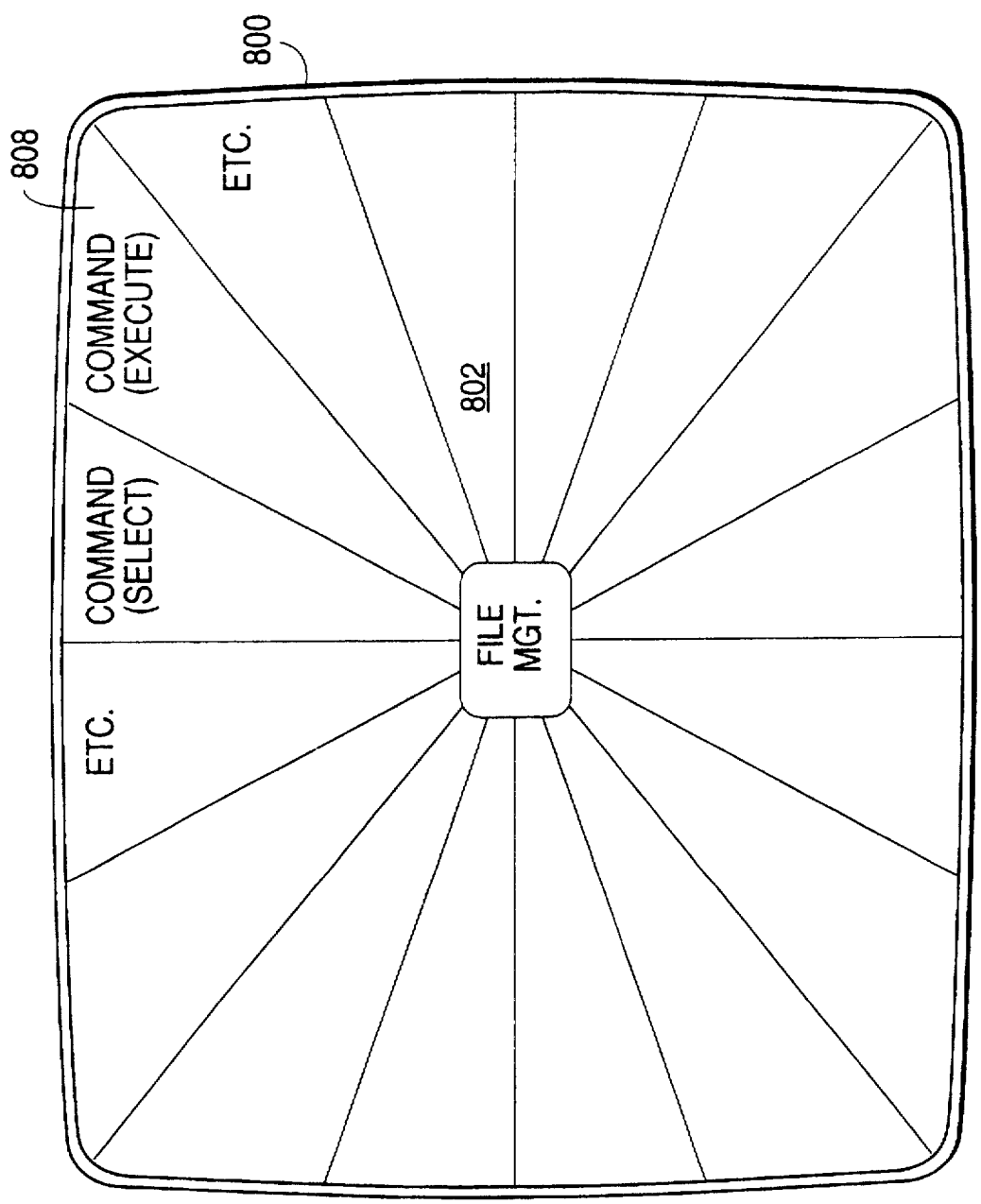
FIG. 8 illustrates a full screen select/execute menu according to one embodiment of the present invention.

FIG. 8 depicts another embodiment of the present invention. In FIG. 8, a full screen select/execute menu 802 is depicted in menu screen 800. By presenting expanded select/execute menus 802, command selectors 808 may be moved to the periphery of menu screen 800. Many more, and much larger commands may be viewed and accessed by one snap and/or one snap and click of user input device 106. Full screen operation as in FIG. 8 may be used in connection with all other embodiments disclosed herein as well.

The size of any select/execute menu may be altered through set-up by zooming in or out. This enables a user to adjust the menus to match his/her skills and his/her own eye/hand/memory capability. Expansion of the menu to the periphery of the screen may be one manner of doing so. Alternatively, a user may want the menu to be co-resident with menu driven program 208.

In certain embodiments it may be desirable for the graphical menu to remain on the screen or be co-resident with menu driven program 208 for longer periods of time. Co-residence may be provided depending on the command selected. For example, co-residence may be provided during execution of a selected command. In other instances, it may be desirable to erase the graphical menu upon selection of a command. In the embodiments of FIGS. 3–8, for example, select/execute menus may be opaque. Because they are opaque, all portions of the data file on the screen not covered by the select/execute menu are visible during the same time the menu is in use.

Figure 9:
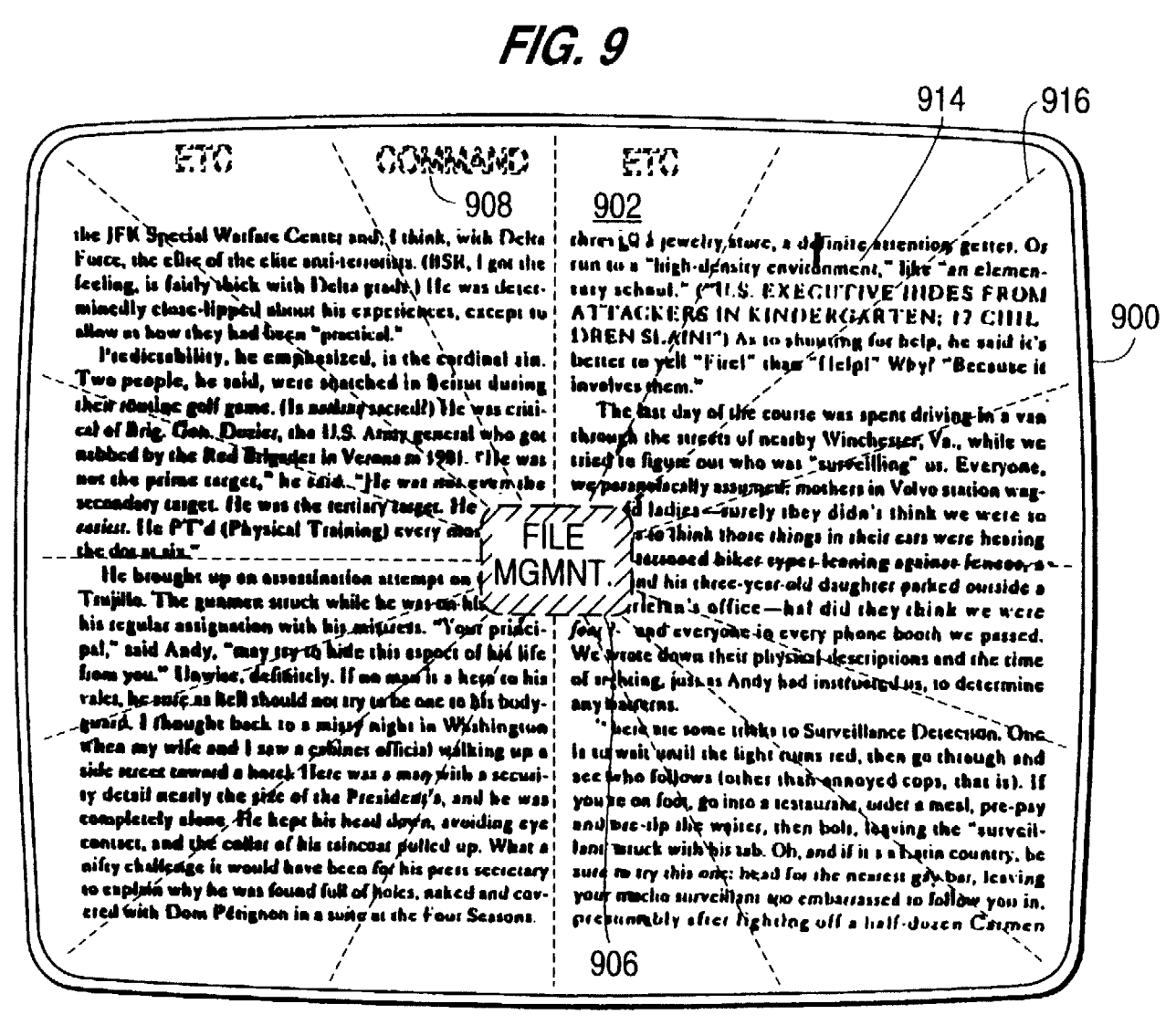

In another embodiment, the select/execute menus may be translucent. In other words, when menu driven program 118 is operating, any graphical display on the screen is simply overlaid with the select/execute menu without completely blocking the underlying text or graphics. For example, FIG. 9 illustrates a select/execute menu 902 in a menu screen 900 similar to that in FIG. 8. Select/execute menu 902 may comprise a plurality of dividing lines 916 dividing the menu into a plurality of command sectors 914 each containing a command selector 908.

Methods of making the select/execute menu translucent are known. Examples of techniques that may be used include stippling, hashing, etc. Preferably lines 916 are dotted or hashed. The translucent select/execute menus function similarly to the select/execute menus described with respect to FIGS. 3–8. Movement of user input device 106 is translated into corresponding movement of highlighter 906 in the direction of one of the command selectors. Slight movement of user input device 106 causes snapping of the command selector 908 in the direction of the movement. After the command selector 908 has been selected, the command may be activated by clicking a button on user input device 106, for example.

By a click of a button on user input device 106 while user input device 106 is directed in the direction of a PARK key, or a combination of button clicks, any select/execute menu may be converted from an opaque menu into a translucent menu, or vise versa. Also, any translucent menu can remain active and on the screen during use of any underlying menu driven program 208.

Figure 10:
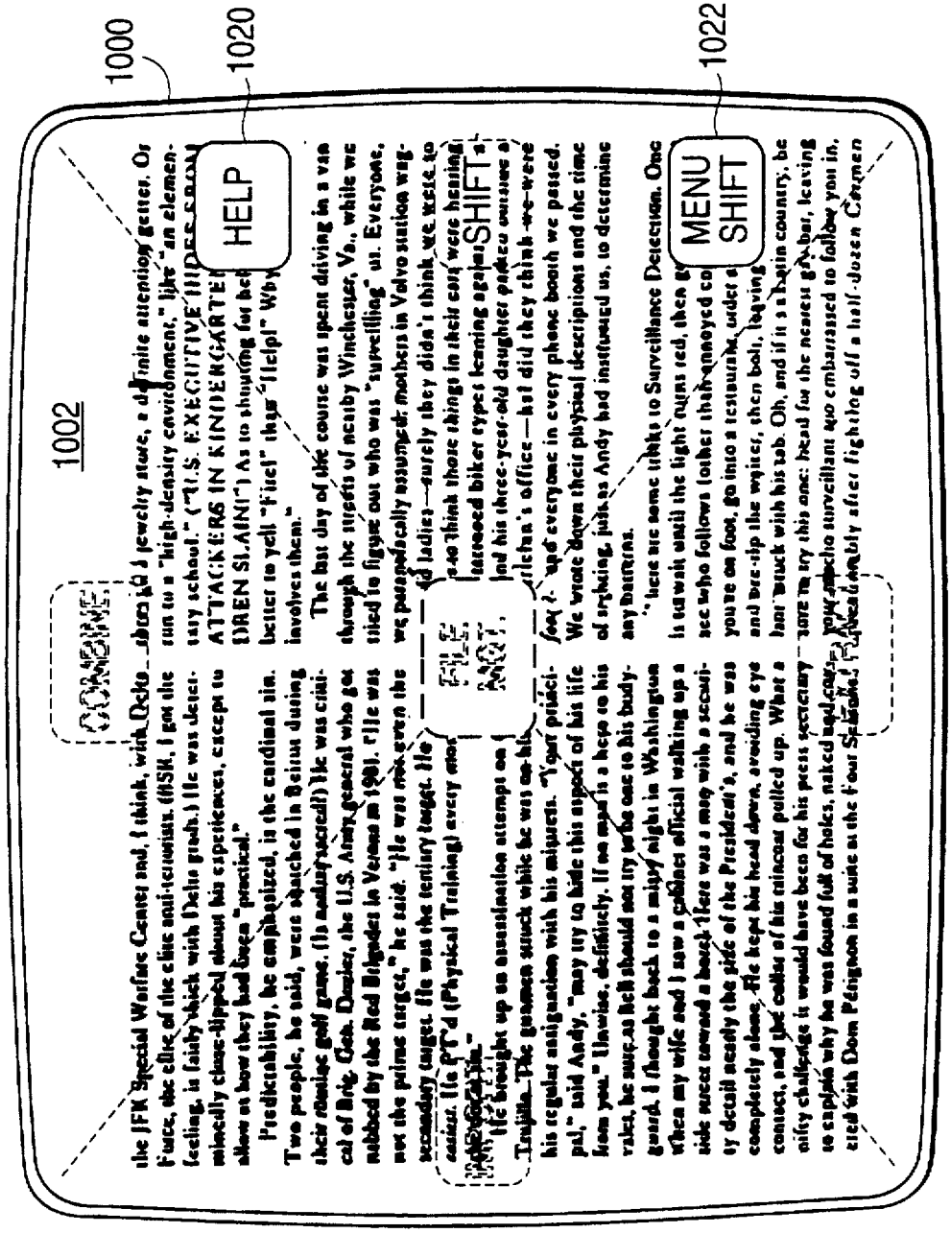
FIG. 10 illustrates a select/execute menu according to another embodiment of the present invention.

When using any menu, the user may select a command to be included in a permanent menu which is always presented somewhere on the screen. In FIG. 10, a menu screen 1000 is depicted having a select/execute menu 1002 presented. Additionally, menu screen 1000 comprises two Permanent Active Resident (or PARK) Keys 1020 and 1022. These PARK's remain on the screen even when select/execute menu 1002 is removed. Examples of PARK's may be a "menu shift" PARK 1022 which may be used to change the menu configuration to accommodate user operating capability in the program in use, a "general help" PARK 1020 which may be used to provide help on any command or a "file management" PARK which allows a user to alter the presently active file. Also, dragging of a cursor within specific menu driven programs or dragging windows conformation may be performed by execution of a PARK key.

A command from any select/execute menu may be selected as a PARK and may be selected to remain on the screen indefinitely. In one example, highlighting and using two buttons simultaneously activates a command as a PARK. Also, a unique radius may be used to execute any PARK in the permanent menu. A combination of keys on a keyboard may also be used to execute a PARK key.

Figure 11:
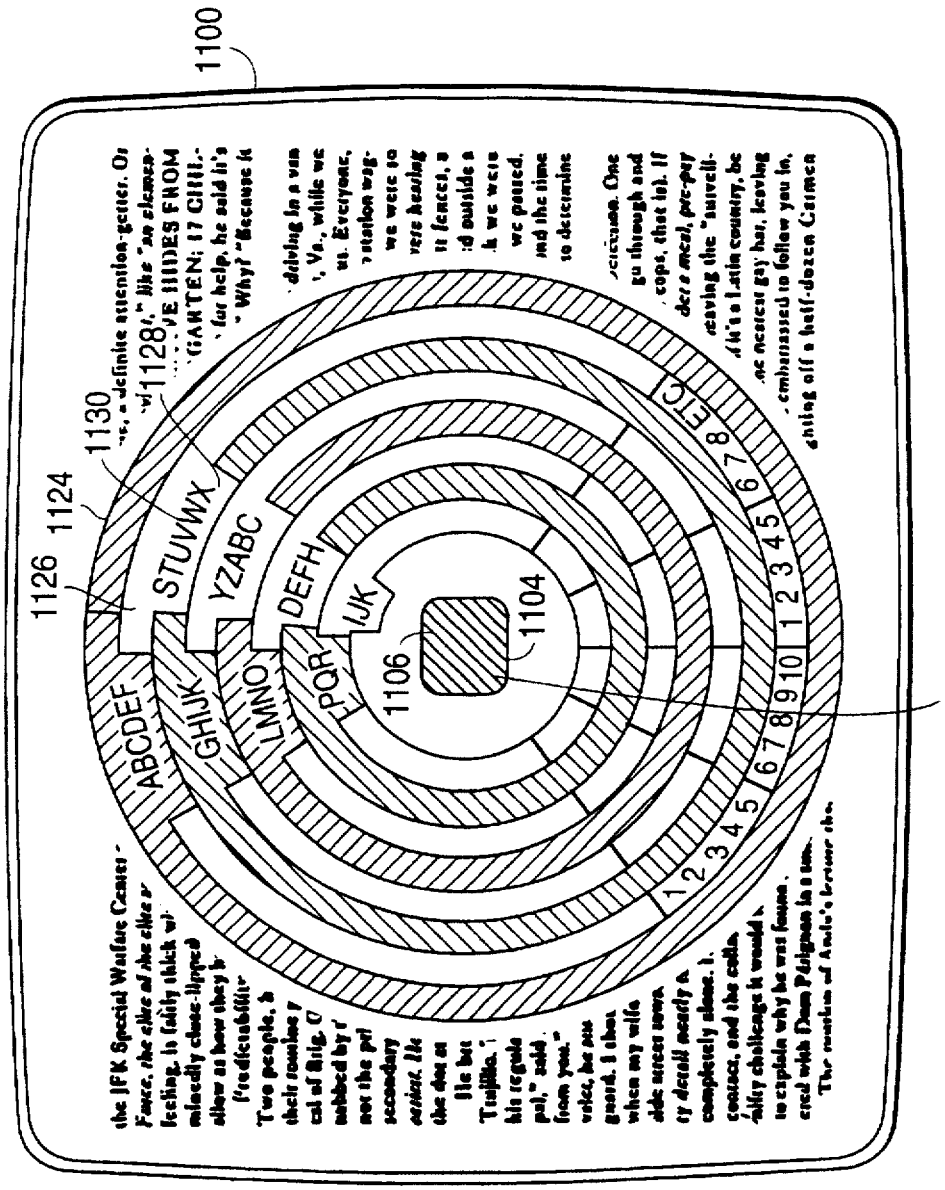
FIG. 11 illustrates a multiple command menu according to one embodiment of the present invention.

Often it may be desirable to have multiple commands accessible on one screen. Instead of presenting only six or eight or so commands in a single select/execute menu, a multiple overlay of command menus may be employed in which a large number of menus and commands may be presented at once. FIG. 11 illustrates an embodiment of a multiple control menu having a large number of menus and commands therein.

FIG. 11 depicts a menu screen 1100. Menu screen 1100 comprises a multiple control menu 1124. Multiple control menu 1124 comprises a focus position 1104, a highlighter 1106, and a plurality of command menu regions 1126 concentrically arranged about focus position 1104. Each region 1126 comprises a menu identification tab 1128 and command labels 1130. Multiple control menu 1124 may comprise a large number of regions 1126, for example, from about 2 to about 10. Regions 1126 may be rings, half-rings, three quarter rings, or other shapes, for example. Each region 1126 represents one select/execute menu or a single executable command. In the case of select/execute menus, each command within that select/execute menu is displayed in the region. Several hundred commands may be executable from a single concentric select/execute menu. Also, through only a few snaps, several thousand commands made be executable by sequencing concentric region select/execute menus.

By allowing the command labels or icons to shift to the periphery of each region, a choice between a number of concentric menu regions (with tabs making the labels more easily visible) is made possible. These regions permit the user to view still more command options simultaneously while also enabling the user to make selections and commands deeper into the program structure. More advanced users are then able to go directly to a command within the choice of regions. These commands may appear in smaller print than the command labels in the tabs and are displayed radially within the region.

Alternatively, each concentric region may be an indicator for a select/execute menu which is presented upon selection of the region. This may be particularly useful for novice users as an initial default menu on which all of or a large portion of the select/execute menus are presented.

Figure 12:
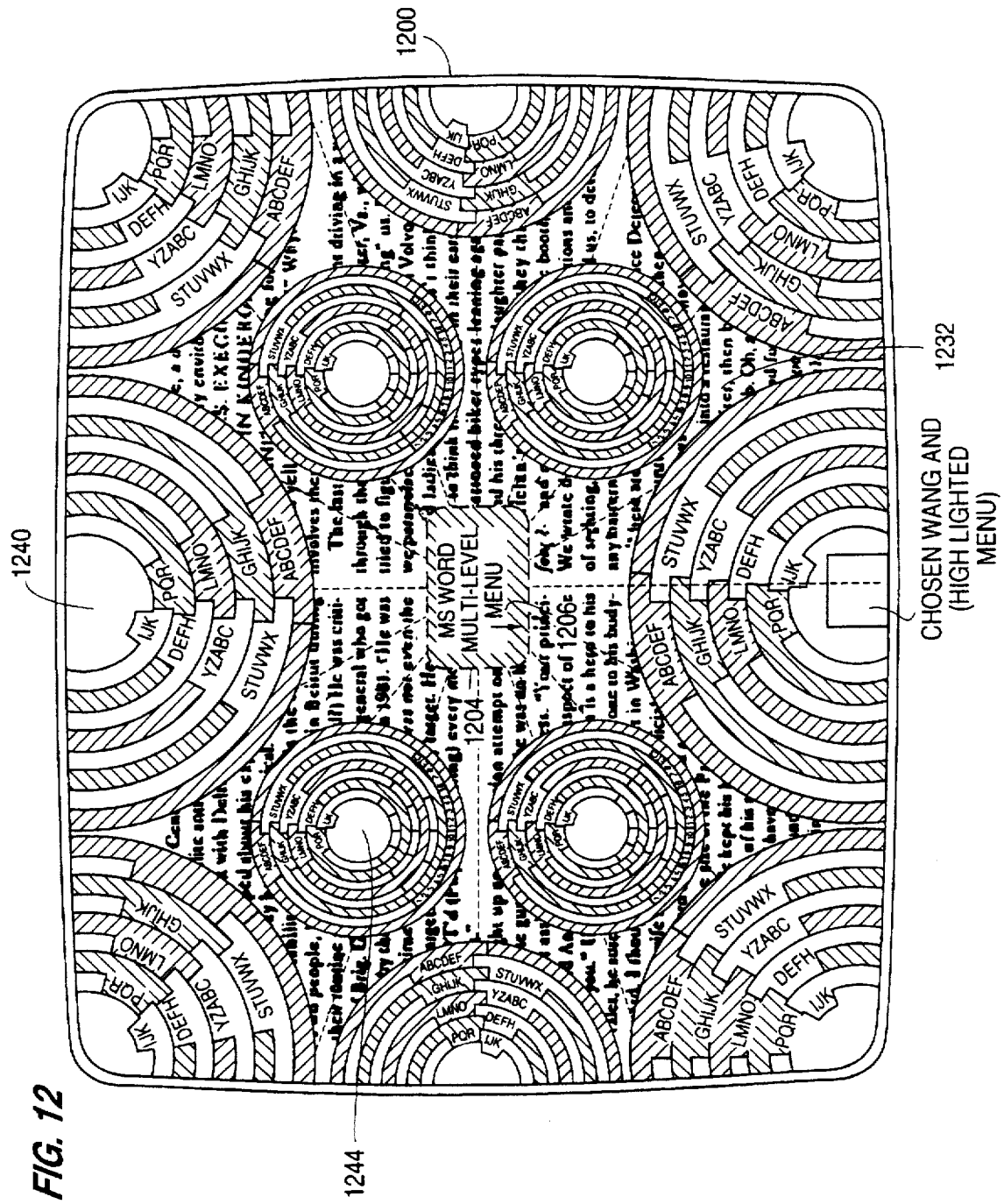
FIG. 12 illustrates a multiple concentric region menu according to one embodiment of the present invention.

In a further embodiment, a user may move or snap the highlighter to any one of a plurality of sub-foci, with each focus position within one of a plurality of concentric region menus appearing on the screen. Another embodiment of the region structure is depicted in FIG. 12. In FIG. 12, a menu screen 1200 comprises a multi-concentric region menu 1232. Multi-concentric region menu 1232 comprises a focus position 1204, a highlighter 1206, and a plurality of concentric region menus 1240 radially distributed about focus position 1204. A user may snap highlighter 1206 into the focus position of one of the concentric region menus 1240. When one of the concentric region menus 1240 is snapped, highlighter 1206 positions itself in the default position, i.e., or focus position of that region 1244. Further snapping of highlighter 1206 within a concentric region menu operates as in the embodiment of FIG. 11. For effective space-saving, concentric region menus 1240 may be only partially positioned on the menu screen 1200. Upon selection of the concentric region menu 1240, the entire menu may be enlarged and moved so that it fits substantially entirely on the screen.

Figure 13:
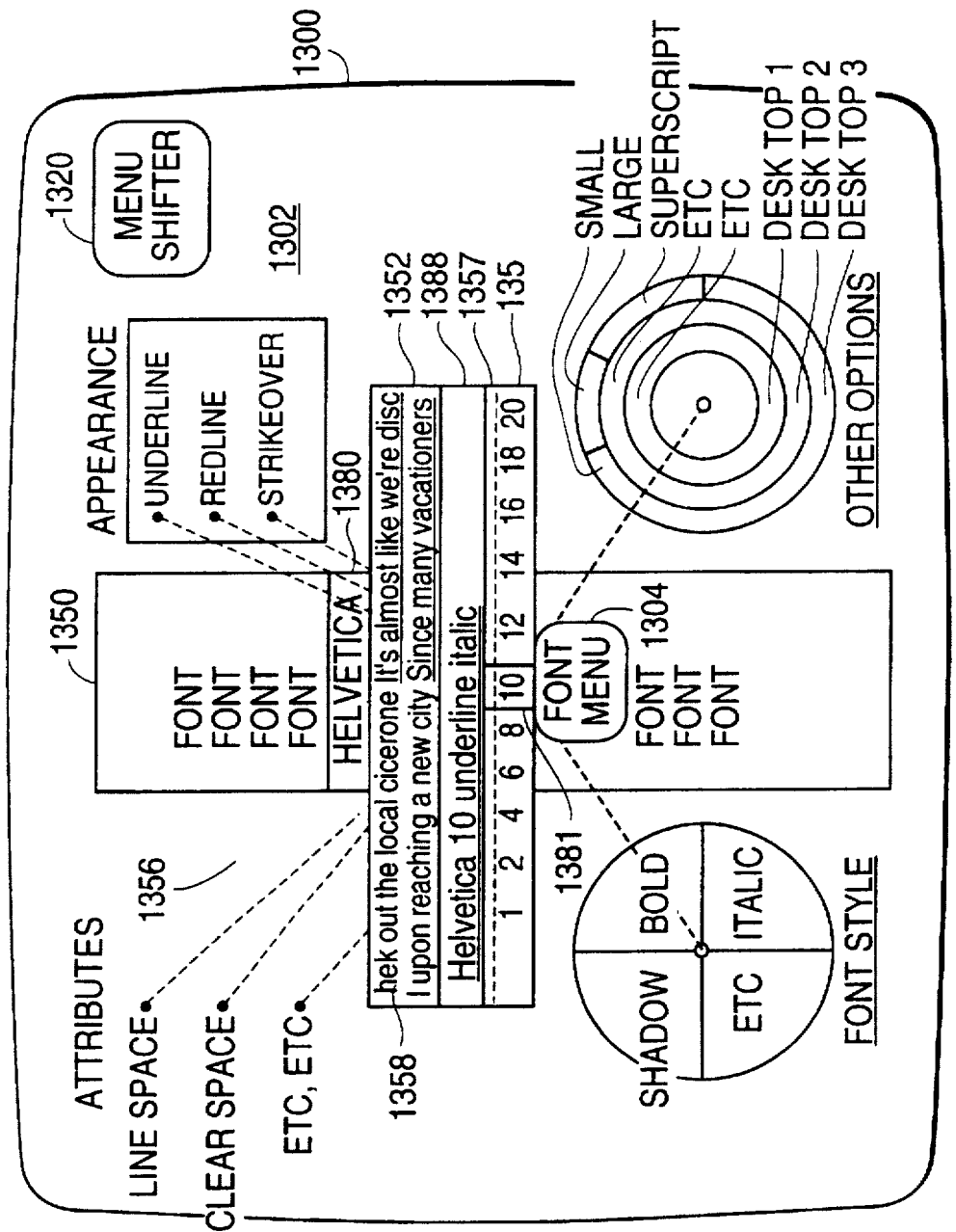
FIG. 13 illustrates a multiple command selection select/execute menu according to one embodiment of the present invention.

In some embodiments, it may be desirable to be able to select more than one command at a time. FIG. 13 depicts a graphical menu according to another embodiment of the present invention for permitting a user to select multiple commands simultaneously. A font selection menu is used for illustration purposes. FIG. 13 illustrates a menu screen 1300 comprising a select/execute menu 1302 for a font command. Select/execute menu 1302 comprises a focus position 1304, a vertical command bar 1350, and a horizontal command bar 1352 subdivided into overlying sub-bars 1354.

Vertical command bar 1350 has a plurality of commands distributed thereon. These commands are general commands. For example, various font styles may be distributed thereon. Horizontal command bar 1352 also has a plurality of commands distributed thereon. For example, various font point size commands may be distributed thereon. The intersection of vertical command bar 1350 and horizontal command bar 1352 forms a cross and thus create quadrants 1356. Each quadrant 1356 may comprise specific command menu headings. Supplemental commands may be illustrated in one or more of quadrants 1356. Specific command menu headings may comprise style commands such as bold, italics, underline, etc., decimals for the point size, or the like. These menus may be used by snapping into their respective quadrants. Select/execute menu 1302 operates as follows. A horizontal selection area 1381 is disposed over a font point size from horizontal command bar 1352. A vertical selection area 1380 is disposed over a font style from vertical command bar 1350. If no active file is opened, then an example of the default font type, size and attribute are displayed in a horizontal selection area 1381 and vertical selection area 1380. The font size may also be displayed in vertical selection area 1380. The effect of the selections may be displayed in a second display area 1358 in actual size or some percentage magnification or reduction thereof. Accumulated commands are shown in accumulated display area 1388 in actual size or in some magnification or reduction thereof. Preferably, the effect of the font selection in display area 1358 is depicted with text from the document in use beginning with the position of the cursor. The user may scroll through the font types in vertical command bar 1350 by moving user input device 106 or keyboard arrows vertically. The commands in vertical command bar 1350 scroll through and are highlighted in center display area 1380.

Likewise, the font point size, CPI or other size designation may be selected by scrolling through the commands on horizontal command bar 1354. The selected font size is displayed in horizontal selection area 1381. Once the user has selected the style and point size, these commands may be activated by clicking the appropriate button on user input device 106, for example. Activation causes processing system 102 to execute the commands in menu driven program 118.

In one embodiment, the commands selected may have a sub-command associated therewith. For example, in the font example of FIG. 13, fonts may be selected in decimal sizes. As such, after an initial click on a button of user input device 106 click which to select the general commands, i.e., the font style and size, the command bars may substitute the sub-commands associated therewith. For example, horizontal command bar 1352 may display decimal values for the font size in a portion 1357 of horizontal command bar 1352. Alternatively, another command bar may be presented (for example a diagonal command bar) which presents decimal values. Sub-commands are then selected in the same manner as the general commands with a click of the mouse button once the desired specific commands are displayed in accumulated display area 1388 and their effect is depicted in second display area 1358.

If the user does not want the sub-commands to automatically be presented upon selection of general commands, the set-up of the menu generating program 210 may be modified to effect that preference.

If the user wishes to modify the style, attributes, or other options regarding the font, a diagonal snap into one of the quadrants activates the specific command menu or actual heading in the quadrant. As such, a command menu displaying the various choices may be presented. Alternatively, a user may then select the desired choice according to a method as discussed with regard to FIG. 3, for example. A scrolling list may be presented for the user to scroll through until the desired command is highlighted, for example. Selection may be made by clicking a user input device 106 button, for example.

Preferably, the user file remains in place during the font modification process. After selection is complete, a user may return to the underlying file on which the font selection is to be effective by pressing the enter key, for example. The cursor stays at its previous position during this selection. In another embodiment, if no font change is desired, a translucent command may be used having the more commonly desired attributes presented thereon. For example, italics, underline, bold, subscript, and superscript may be presented in a translucent select/execute menu.

Some programmable embodiments of the invention enable commands (and the bars containing them) to "scroll" individually through display area 1380 or, in one embodiment, font size and sub-point size scroll through focus position 1304 (default highlighter position). In the scroll part of the cross menus, highlighter 1306 does not snap to the selection. Instead, it offers a plurality of selections with, in some settings, the horizontal (font size) and the vertical (font face) being scrolled by a movement of the highlighter. When both have been selected by the scroll, their command can be activated by one click. User input device 106 can also be used to snap into any of the diagonal quadrants 1358 displayed here in other menu modes from which individual commands may be clicked on.

In another embodiment, commands may be selected by scrolling horizontally, vertically and/or diagonally through a focus position. FIG. 14 depicts a menu screen 1400 comprising a select/execute menu 1402. Select/execute menu 1402 comprises a vertical command bar 1450, a horizontal command bar 1452, and diagonal command bars 1460 and 1462. In this embodiment, many commands may be selected simultaneously. The number of commands which may be selected simultaneously may be varied by adding or eliminating diagonal command bars. Once the desired combination of commands is presented in the various display areas 1480, the user may select the commands by clicking on a button on user input device 106. PARK key 1420 brings up "menu shift" by one snap in the appropriate radius or combination snap and button click on user input device 106.

In the embodiment of FIG. 14, along diagonal command bar 1460, selection of a window may be provided. In the lower half, an activated window arrangement 1482 is presented as highlighted to distinguish it from other potential window arrangements along that portion of the command bar. The window arrangement 1482 of FIG. 14 depicts a four window tiled format. The upper half of the diagonal command bar 1460 thus presents options for selection of one of the windows. The active window segment display 1490 is highlighted as well. The user may thus alter the window of operation by selecting various arrangements and windows within those arrangements along diagonal command bar 1460.

Additionally, a rotate key 1475 may be provided. By pressing the rotate key 1475, the user may rotate the position of the command bars. For example, data C may be rotated to be displayed in the vertical position. In this embodiment, one or more of the command bars may be larger than others. Therefore, more command bars may be presented on a single screen. Rotation of the desired command bar into one of the larger positions enables the user to more readily identify a desired command.

Figure 15:
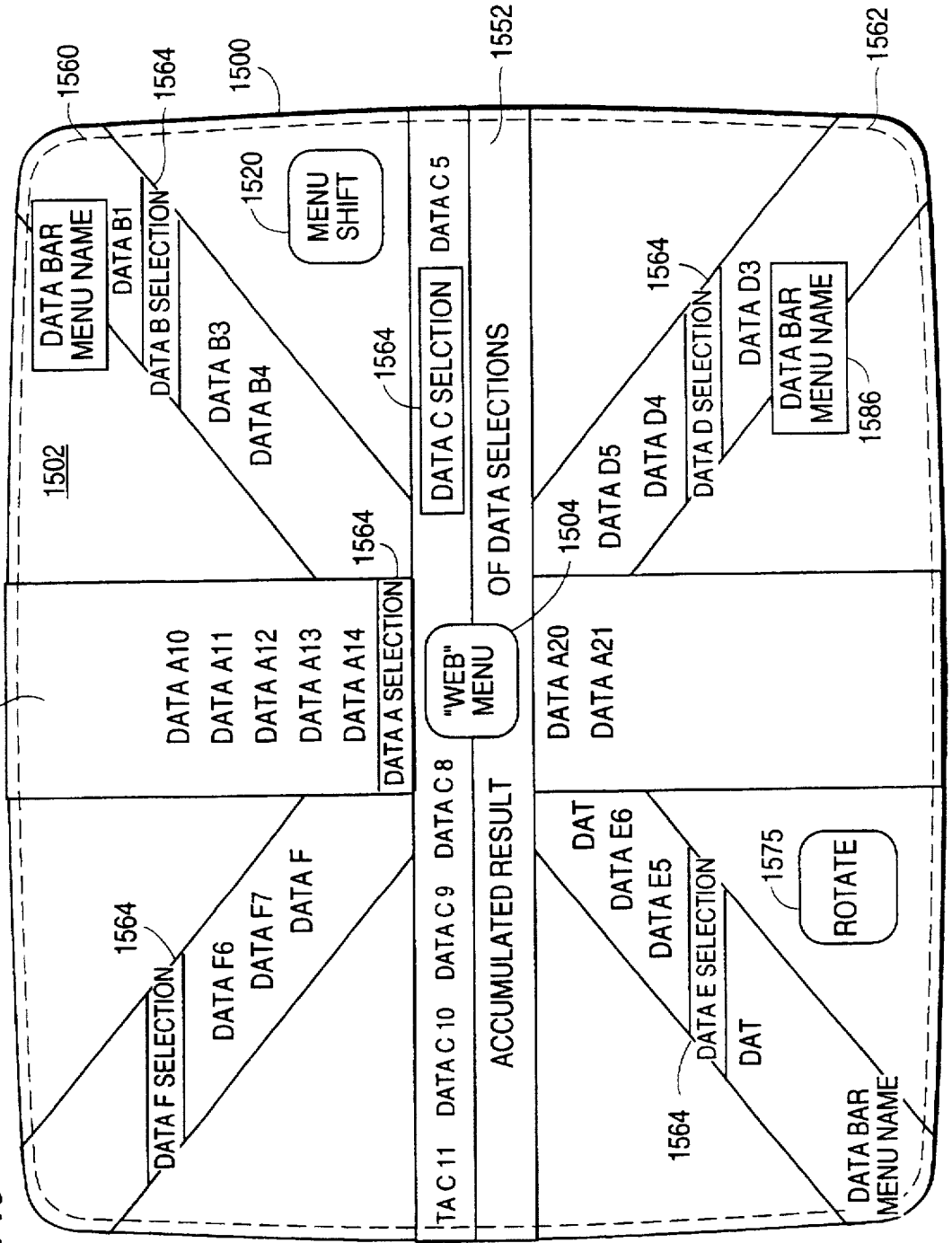
FIG. 15 illustrates a multiple command selection select/execute menu according to another embodiment of the present invention.

In FIG. 15, another embodiment is illustrated. Menu screen 1500 comprises a select/execute menu 1502 having a focus position 1504, a vertical command bar 1550, a horizontal command bar 1552, and diagonal command bars 1560 and 1562. Along diagonal command bars 1560 and 1562 are distributed various scroll positions 1564. Each scroll position also serves to indicate the currently selected command along that command bar. Additionally, each command bar has associated therewith a data bar menu name 1586 to indicate what types of commands are presented along the command bar. A rotate key 1575 may also be provided.

By snapping into a scroll position, selection among commands on the command bar on which the scroll position is located may be performed. Once the snap to the scroll position is achieved, scrolling through the commands may be effected by movement of user input device 106 in either direction along the bar desired. For example, if the scroll position which has been snapped is on the top diagonal command bar 1560, scrolling in an up-right and down-left direction may be used to scroll through the commands on that command bar. To return to focus position 1504, the escape key on the keyboard may be pressed, for example.

Alternatively, the embodiment of FIG. 15 may be operated in a non-snap fashion. In this embodiment, movement of user input device 106 in the direction of one of the scroll positions may effect scrolling of the commands along that command bar through the scroll position 1564 in one direction or two directions. If two directional scrolling along a command bar is used, the command bars passing through focus position 1504 are loopedly connected. In other words, only one command from that command bar is selectable and each command on the command bar scrolls through the selection position. When one directional scrolling is used, two commands on a command bar passing through focus position 1504 may be selected at once. This embodiment thus permits a user to select a multitude of command simultaneously as well. Snap and scroll may be faster for command bars having a large number of commands because scrolling in two directions from the scroll position as opposed to one direction from the focus position is faster in most situations.

Additionally, a PARK command 1520 may be provided which enables rotation of menu bars to the vertical or horizontal position with a single click or double button click at the appropriate radius, leaving menu selections available in a plurality of other menu bars. This embodiment is especially useful in examining extra large data bases, for example.

Figure 16:
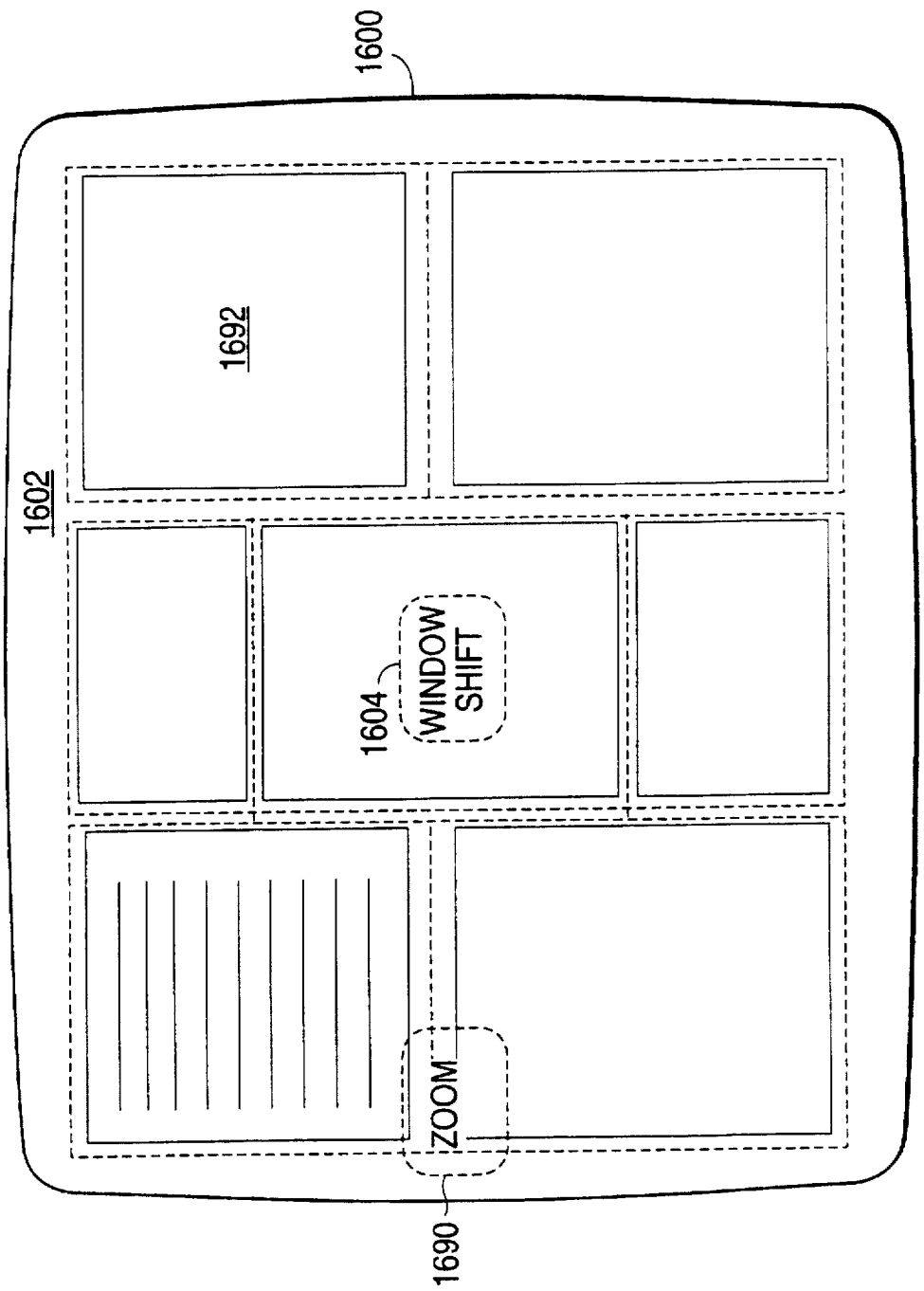
FIG. 16 illustrates a select/execute menu according to another embodiment of the present invention.

FIG. 16 illustrates an embodiment of a select/execute menu for selecting between windows in which the operator may operate. A menu screen 1600 comprises a select/execute menu 1602 having a focus position 1604. A plurality of windows 1692 are radially distributed about focus position 1604. Snapping a desired window selects that window for presentation and activation for operation. Preferably, the cursor returns to the previous location upon activation of any window.

Once a desired window has been selected, the size of the window may be altered by movement of user input device 106. For example, movement up and down of user input device 106 may increase and decrease the height of the window. Movement left and right may increase and decrease the width of the window. Preferably, unselected windows are then presented translucently on the screen.

Figure 17:
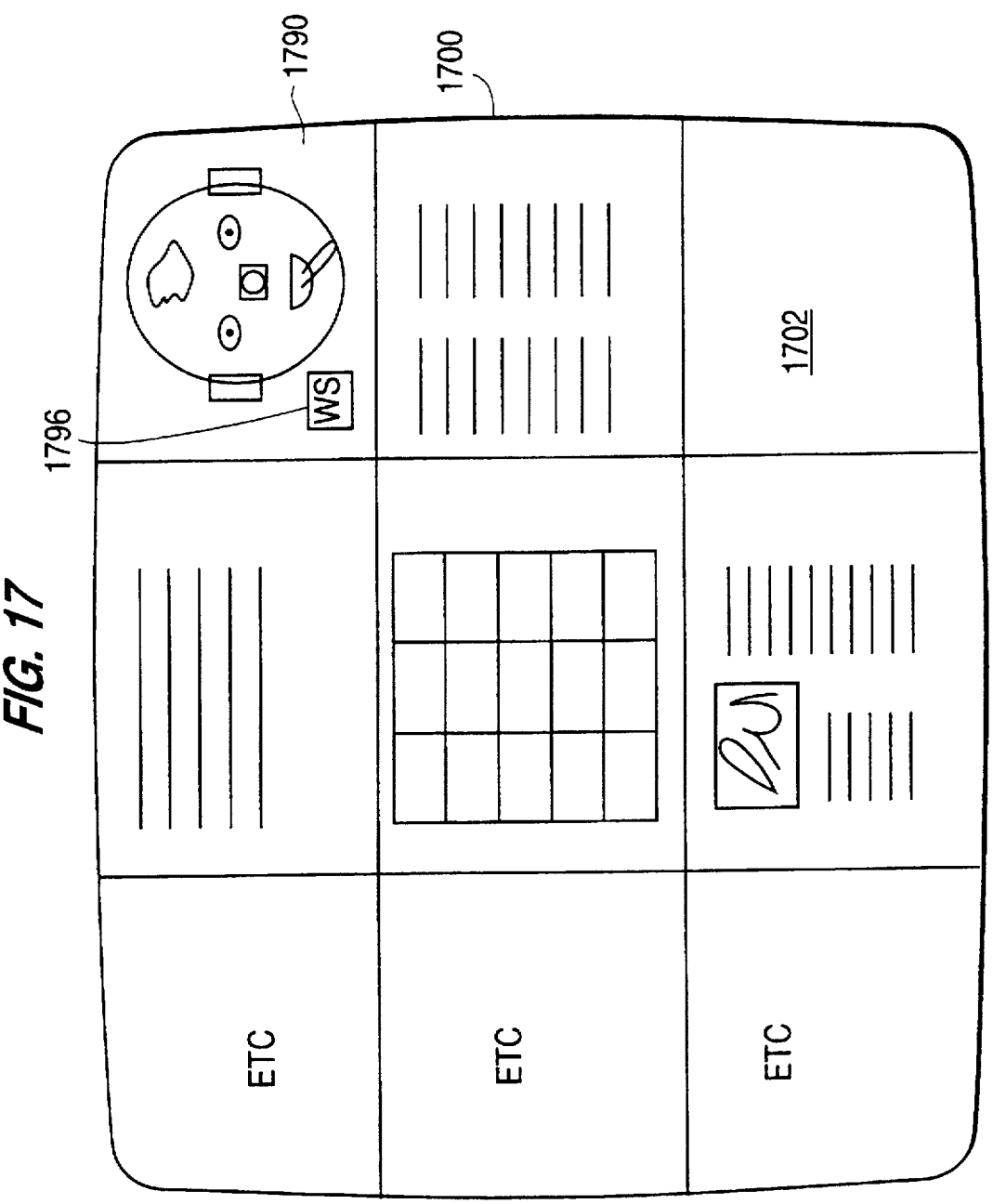
FIG. 17 illustrates a select/execute menu according to another embodiment of the present invention.

FIG. 17 illustrates another embodiment of a window selection select/execute menu 1702 of the present invention. Menu screen 1700 comprises a plurality of windows 1790 placed in tile format on the screen. One of the windows may be active, for example, the top right window. In the active window, a window select hot key 1796 is provided. By selecting this PARK key, the user may be presented with select/execute menu 1602, for example, to select a window for operation.

Figure 18:
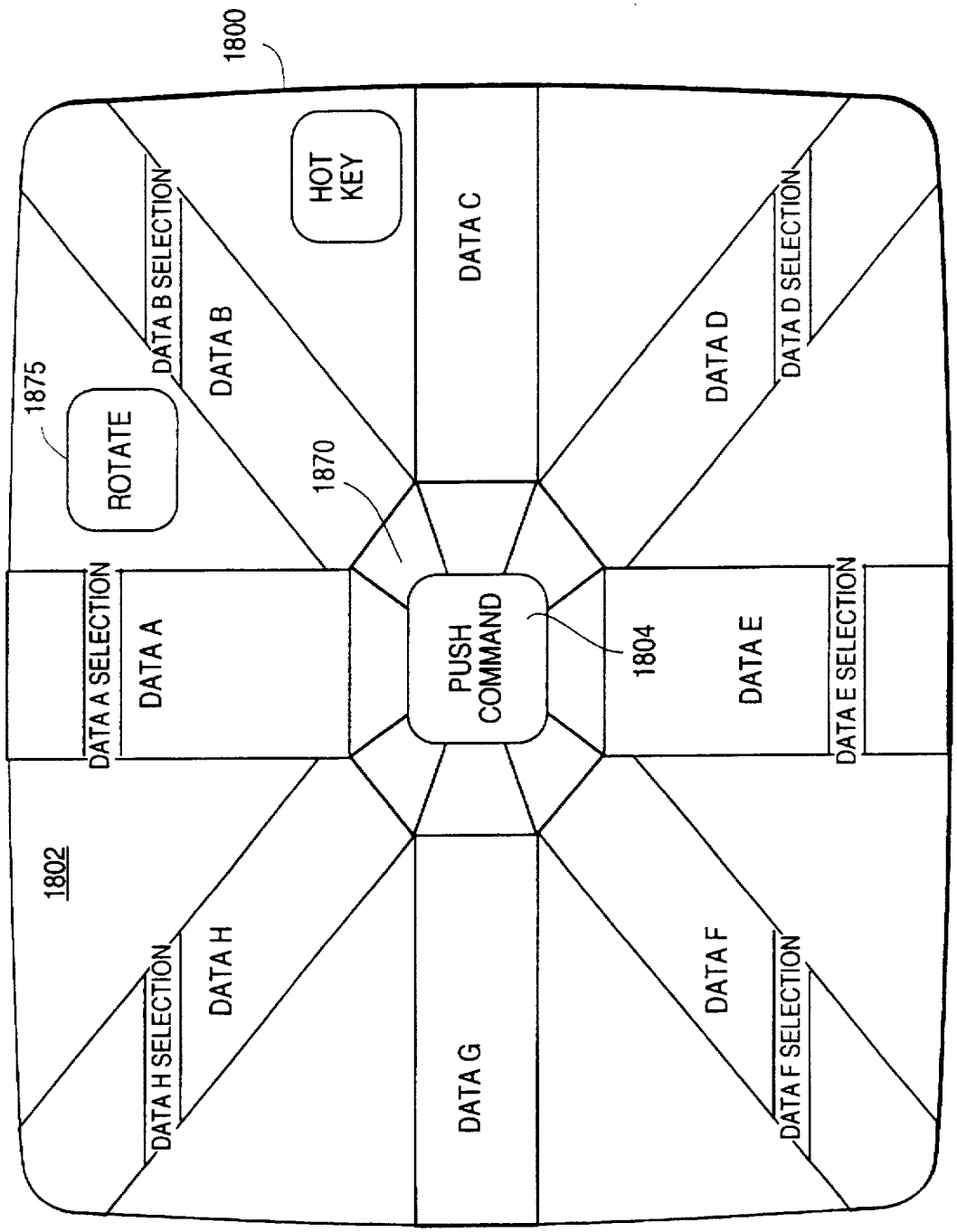
FIG. 18 illustrates a multiple command selection select/execute menu according to another embodiment of the present invention.

In each of the embodiments of the cross type menu, or double cross-menus having diagonals, scrolling through menu selections may be useful as touch screen and as such have tough screen locations. FIG. 18 depicts an embodiment having selection pads 1870 on a select/execute menu 1802. This embodiment may be particularly useful for touch-screen technology. In this embodiment, scrolling through commands on a command bar occurs when a user touches one of the selection pads 1870 adjoining the command bar. A rotate key 1875 may also be provided.

Figure 19:
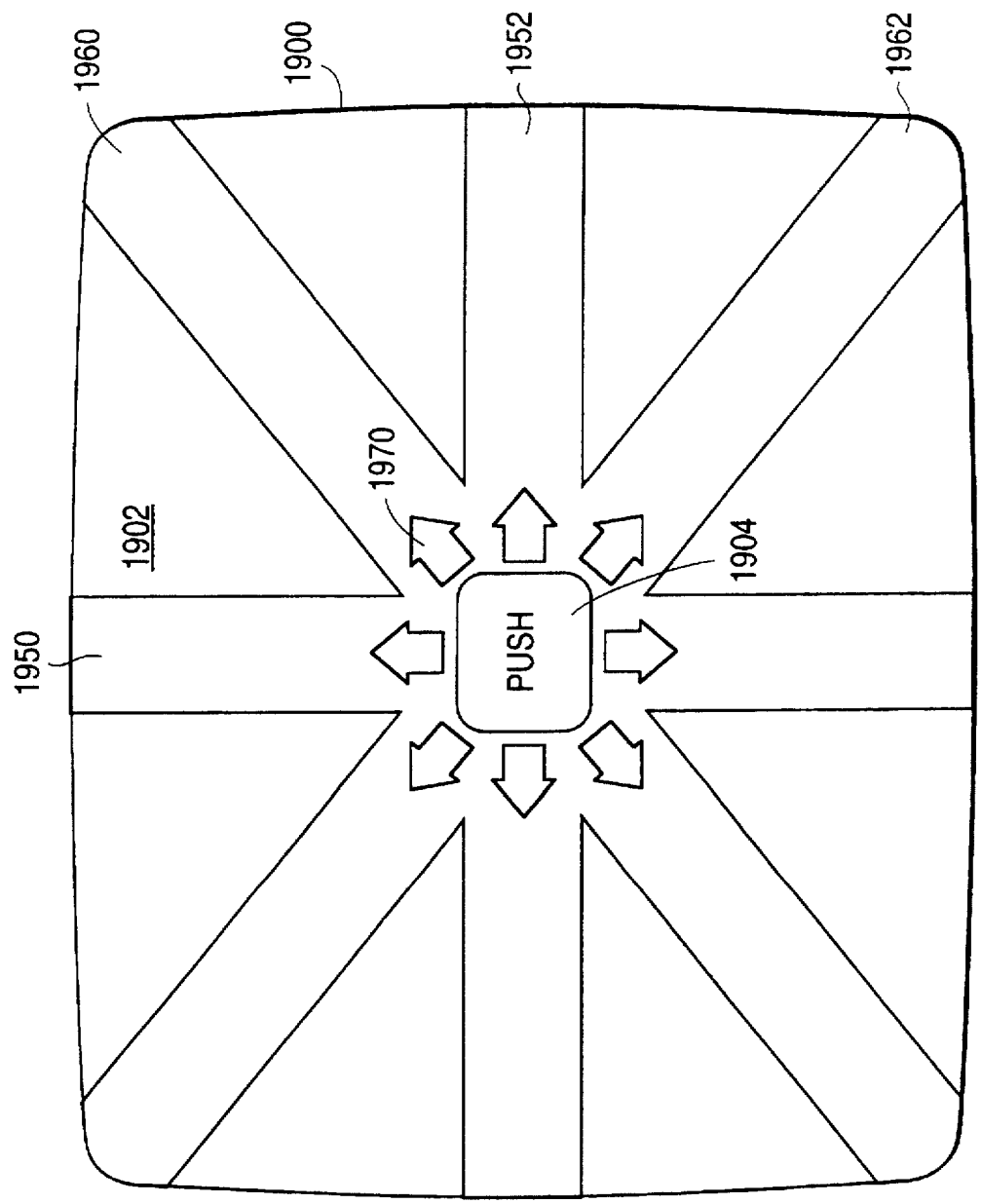
FIG. 19 illustrates a multiple command selection select/execute menu according to another embodiment of the present invention.

In another embodiment, selection pads may be formed as arrows. FIG. 19 depicts a menu screen 1900 having a select/execute menu 1902 with a focus position 1904. Selection pads 1970 in the shape of arrows are radially distributed about focus position 1904.

As a further mnemonic tool, in each of these embodiments different colors for each command may be used. For example, in select/execute menus having a discrete number of commands such as about six, red, blue, green, orange, yellow, and purple may be used. These colors are particularly effective to enhance the icon-in-icon feature. Also, different hatching presentations may be used. For example, wallpapering type of backgrounds may be used for various command selectors, focus positions, screens, and select/execute menus.

In yet another embodiment of the present invention, the user input device 106 may be programmable. In this embodiment, menu generating program 210 may reside in the user input device 106. Interface software may be provided between user input device 106 and menu driven program 208.

As has been presented, primary menu configurations may be in the form of a circle (or other mnemonic icon), a set of concentric circles, a group of concentric circles, a cross of scrolling radial bars and a variation of a scrolling cross arrangement, each of which may be executed in touch screen. Other embodiment of the present invention are also possible, each being chosen to match the characteristics and complexity of any part of the menu driven program 208 being used. These menus may also be designed to correspond to the experience and physical ability of the user.

Figure 20:
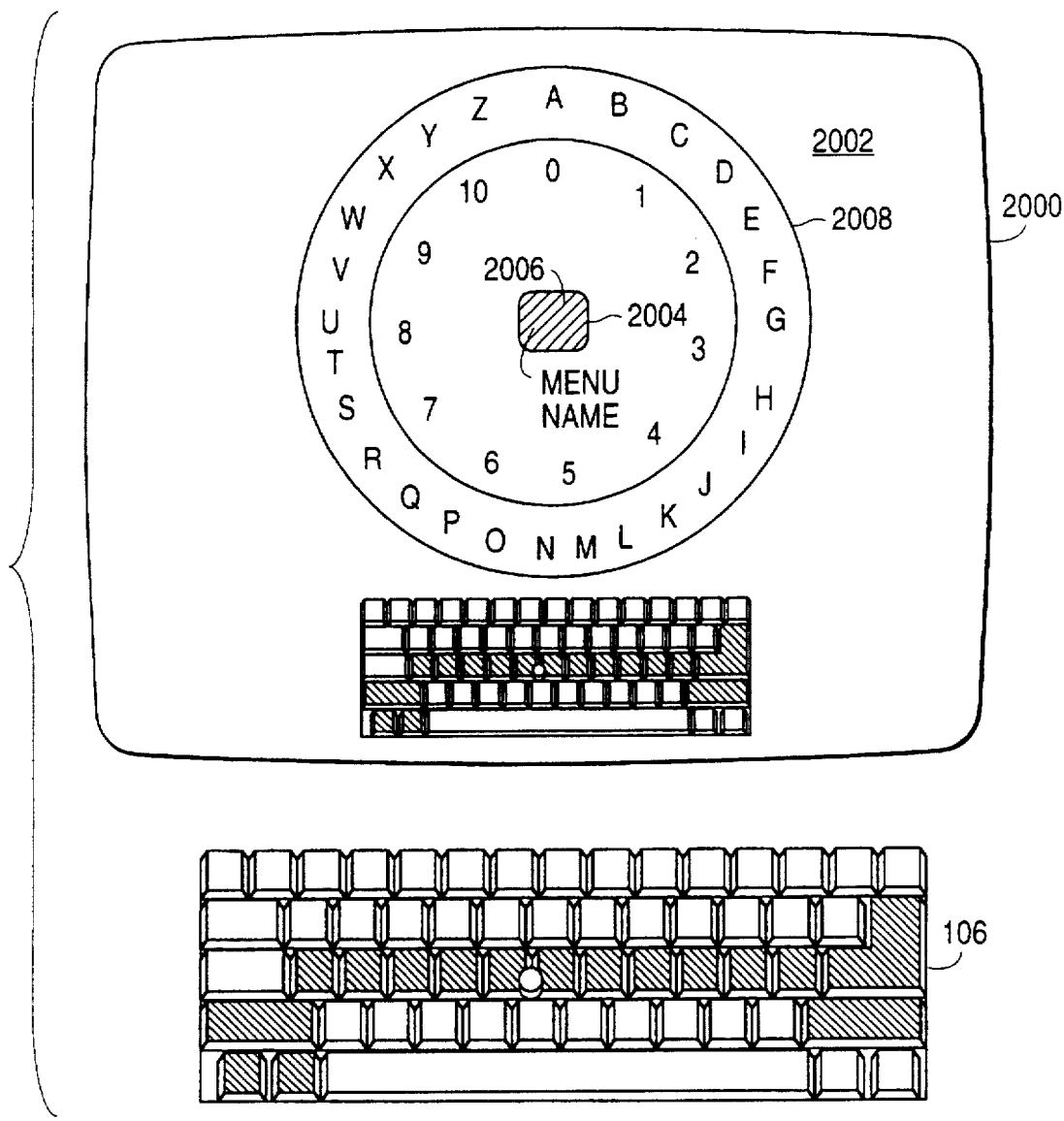
FIG. 20 illustrates a multiple command selection select/execute menu according to another embodiment of the present invention.

Also, the present method of inputting information may be used in place of a keyboard in another embodiment for not only inputting and selecting commands, but for inputting all types of information. FIG. 20 depicts an embodiment of this feature. Menu screen 2000 comprises a select/execute menu 2002 having a focus position 2004 and a plurality of command selectors 2008 radially distributed around focus position 2004. Command selectors 2008 in this embodiment may be either alphanumeric characters or any other keyboard equivalent such as a delete key or a home key, for example. By snapping to the desired command selector, input of data into a file in any environment may be provided.

In another embodiment, menu screen 2000 of FIG. 20 may be used as a display to allow a user to see which keys are being input. In this embodiment, a user input device 106 for inputting information. User input device 106 may be either a keyboard, mouse or a memory aid mouse (or a plurality thereof) may be used. In FIG. 20, a keyboard is used, however, only seventeen keys (as highlighted in FIG. 20) of the keyboard are used. By using the shift key, alt key, control key, and caps lock key, for example, shifting between rows on the keyboard may be effected. Thus, to input a q, pressing the shift key and the letter a may be used. Pressing the shift key changes the active row to the upper row and inputting a selects the character on that row. A highlighter 2006 may move over the command selector corresponding to the selected character.

In another embodiment, user input device 106 may comprise ten, eight, or four finger pad mnemonic mice. Each memory aid mouse in this embodiment may have a plurality of "keys" associated therewith for execution. For example, one mouse may be programmed to input q, w, e, d, c, x, z, and a by being moved in a different manner. In this embodiment, user speed and accuracy of several orders of magnitude may be provided. Each movement of user input device 106 inputs a character or the some other keyboard stroke equivalent. This embodiment may be particularly effective for persons having use of only one hand, for example. Also, portable or laptop computers may be reduced through use of a device of this type. Radial distribution of keys selectable by a mouse of this type is thus effective in many environments and not specifically tied to menu selection. Thus, without removing fingers from either mouse or keyboard (depending on which is used) a user may find and execute with a single key stroke many times faster than is now possible. For example, this embodiment may be used for inputting a letter, number or symbol into a work file, any selection and/or execution of a command, a change in command graphical presentation selection within any software application in use or access to other files, software and/or data base possibilities. The arrangement of the keyboard or mouse is adjustable to meet the user's needs and specifications.

The above described methods provide for seamless movement from operating system through appliations software and actual work files. While this invention has been described with reference to specific embodiments, it is not intended that the invention been limited thereto. The invention is only limited by the claims which follow.

What is claimed is:

1. A computer system comprising:

a processor means;

a program memory means, coupled to the processor means, for storing programs executed by the processor means;

a display means, coupled to the processor means, for displaying images under control of the programs executed by the processor means;

the programs stored in the program memory including at least one menu driven program for creating a graphical display on the display means;

a menu generating means, cooperating with the at least one menu driven program, for displaying at least one menu on the display means;

each menu comprising a focus position and a plurality of radially distributed command selectors located along predetermined radii from the focus position, each command selector permitting selection of a command to be executed;

a user input means, connected to the processor means, for providing signals indicative of movement of the user input means;

a highlighter;

wherein the menu generating means receives the signals indicative of movement of the user selection means and moves the highlighter in a corresponding direction from the focus position; and, wherein movement of the highlighter toward one of the plurality of radially distributed command selectors selects the command corresponding to that command selector.

2. The computer system of claim 1 wherein the menu generating means superimposes the menu over the graphical display generated by the at least one menu driven program.

3. The computer system of claim 1 wherein the graphical display has a center and the focus position of the menu is placed over the center of the graphical display.

4. The computer system of claim 1 wherein the menu generating means further positions a highlighter in the focus position of the menu.

5. The computer system of claim 1 wherein the movement of the highlighter that selects the command is a snap.

6. The computer system of claim 1 wherein the menu generating means is responsive to the user input means to generate the menu.

7. The computer system of claim 6 wherein the user input means comprises at least one button and wherein the menu generating means generates the menu when the user clicks one of the buttons.

8. The computer system of claim 1 wherein the menu generating means erases the menu upon selection of a command.

9. The computer system of claim 1 wherein the menu is translucent.

10. The computer system of claim 9 wherein the menu generating means displays the menu during execution of the command.

11. The computer system of claim 10 wherein the selected command is a two step command comprising an initiating command and a completion command, wherein the menu comprises at least one initiating command and at least one completion command and wherein the menu generating means displays the menu from the time the initiating command is activated until a completion command has been selected and activated.

12. The computer system of claim 1 wherein the user input means is a mouse.

13. The computer system of claim 1 wherein the user input means is an eraser mouse.

14. The computer system of claim 1 wherein the user input means is a touch mouse.

15. The computer system of claim 1 wherein the commands comprise special commands and wherein execution of the command occurs when the command is snapped and a confirmation action is performed by the user.

16. The computer system of claim 1 wherein the menu driven program is a word processing program.

17. The computer system of claim 1 wherein the menu driven program is a spreadsheet program.

18. The computer system of claim 1 wherein the command selectors are disposed in command sectors which are graphically represented by a shape.

19. The computer system of claim 14 wherein adjacent command sectors share at least one outwardly extending edge.

20. The computer system of claim 1 wherein each menu consists essentially of a menu icon.

21. The computer system of claim 20 wherein each command selector is graphically represented in a portion of the menu icon.

22. The computer system of claim 21 wherein the portions within the menu icon comprise command icons.

23. The computer system of claim 20 wherein different menus are represented by different menu icons.

24. The computer system of claim 22 wherein different command selectors are represented by different command icons.

25. The computer system of claim 1 further comprising means for "PARK"ing a command such that the command becomes a permanent resident key.

26. The computer system of claim 25 further comprising a drag PARK key for permitting a cursor in the graphical display generated by the at least one menu driven program to be dragged within that graphical display.

27. The computer system of claim 1 further comprising means for adjusting the amount of movement of the user input means necessary for user input means to provide an indicating signal.

28. The computer system of claim 1 further comprising means for adjusting the menu responsive to the user input means.

29. The computer system of claim 28 wherein the means for adjusting adjusts the size of the menu.

30. The computer system of claim 28 wherein the means for adjusting adjusts the opaquity of the menu.

31. The computer system of claim 28 wherein the means for adjusting adjusts the number of commands presented on a menu.

32. The computer system of claim 28 wherein the means for adjusting adjusts the number of commands presented on along a radius of a menu.

33. The computer system of claim 28 wherein the means for adjusting accepts a default menu which is presented by the menu generating means.

34. The computer system of claim 33 wherein the means for adjusting accepts input regarding a command which is to be included in the default menu.

35. The computer system of claim 28 wherein the means for adjusting adjusts features of menus which match the level of experience and physical ability of the user.

36. The computer system of claim 1 wherein at least one radius has a plurality of commands distributed there along.

37. The computer system of claim 36 wherein selection of each command is effected by snapping along the radius to the desired command.

38. The computer system of claim 36 wherein selection of each command is effected by corresponding movement of the user input means along the radius.

39. The computer system of claim 1 wherein the command selectors comprise executable command selectors and menu indicators.

40. The computer system of claim 1 wherein the command selectors comprise executable command selectors and menu indicators and wherein the menu generating means is responsive to selection of a menu indicator through the user input means to generate a menu corresponding to the menu indicator.

41. The computer system of claim 1 wherein the radii along which the command selectors are disposed are separated by at least about 45 degrees.

42. The computer system of claim 1 wherein help on a command may be executed by snapping beyond the command selector corresponding to that command.

43. The computer system of claim 40 wherein every movement of the user input means selects a command or menu indicator in the menu.

44. The computer system of claim 1 wherein the command selectors represent an alphanumeric character to be input.

45. A method of operating a computer system on which a menu driven program for creating a graphical display on a display is operated comprising the steps of:

generating a menu comprising a focus position, a highlighter, and a plurality of radially distributed command selectors located along predetermined radii from the focus position, each command selector permitting selection of a command to be executed, the highlighter being presented substantially at the focus position;

inputting a direction indicative signal from a user;

moving a highlighter from the focus position in a direction corresponding to the direction indicative signal; and selecting the radially distributed command selector located along the predetermined radius most closely correlated with direction of the direction indicative signal.

46. The method of claim 45 wherein the step of moving a highlighter is a snap.

* * * * *